(12) United States Patent
Pham et al.

(10) Patent No.: US 12,099,516 B2
(45) Date of Patent: Sep. 24, 2024

(54) DATA VISUALIZATION DEVICE AND METHOD

(71) Applicant: Texas Tech University System, Lubbock, TX (US)

(72) Inventors: Van Vung Pham, Lubbock, TX (US); David C. Weindorf, Riverdale, MI (US); Tommy Dang, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 18 days.

(21) Appl. No.: 17/641,911

(22) PCT Filed: Sep. 11, 2020

(86) PCT No.: PCT/US2020/050313
§ 371 (c)(1),
(2) Date: Mar. 10, 2022

(87) PCT Pub. No.: WO2021/055243
PCT Pub. Date: Mar. 25, 2021

(65) Prior Publication Data
US 2022/0327140 A1 Oct. 13, 2022

Related U.S. Application Data

(60) Provisional application No. 62/900,688, filed on Sep. 16, 2019.

(51) Int. Cl.
*G06F 16/26* (2019.01)
*G06F 3/038* (2013.01)
*G06F 3/0484* (2022.01)

(52) U.S. Cl.
CPC .............. *G06F 16/26* (2019.01); *G06F 3/038* (2013.01); *G06F 3/0484* (2013.01)

(58) Field of Classification Search
CPC ........ G06F 16/26; G06F 3/038; G06F 3/0484; G06F 16/9038; G06T 11/206
See application file for complete search history.

(56) References Cited

U.S. PATENT DOCUMENTS

| 7,649,975 B2 | 1/2010 | Boyden et al. |
| 10,042,517 B2 | 8/2018 | Stolte et al. |

(Continued)

FOREIGN PATENT DOCUMENTS

| EP | 3276338 A2 | 1/2018 |
| WO | 02/21423 A2 | 3/2002 |

OTHER PUBLICATIONS

Amar R., et al., Low-level components of analytic activity in information visualization. In Information Visualization, 2005. INFOVIS 2005. IEEE Symposium on (2005), IEEE, pp. 111-117.

(Continued)

*Primary Examiner* — Mark D Featherstone
*Assistant Examiner* — Kweku William Halm
(74) *Attorney, Agent, or Firm* — Daniel J. Chalker; Edwin S. Flores; Chalker Flores, LLP

(57) ABSTRACT

An apparatus and method include: receiving a data set having two or more variables; receiving a selection of at least one of the two or more variables, an abstraction level and a visual feature; automatically generating and displaying a set of visual representations of the data set on the display; receiving a change in the selected variables, selected abstraction level, the selected visual feature, or a selection from various views; determining a visual representation recommendation based on the selected variable(s), selected abstraction level and the selected visual feature, the change in the selected variables, selected abstraction level, the selected visual feature, or the selected views; and automatically updating and displaying the set of visual representations of the data set on the display based the visual repre- (Continued)

sentation recommendation, and the change in the selected variables, selected abstraction level, the selected visual feature, or the selected views.

34 Claims, 20 Drawing Sheets

(56) References Cited

U.S. PATENT DOCUMENTS

| | | | | |
|---|---|---|---|---|
| 2012/0212484 | A1* | 8/2012 | Haddick | G06Q 30/02 345/419 |
| 2013/0031514 | A1* | 1/2013 | Gabbert | G06F 3/04883 715/863 |
| 2017/0300540 | A1* | 10/2017 | Karpistsenko | H04L 67/2885 |
| 2018/0189294 | A1* | 7/2018 | Anand | G06F 16/338 |
| 2018/0373507 | A1 | 12/2018 | Mizrahi et al. | |
| 2019/0034079 | A1 | 1/2019 | Zeevi | |
| 2019/0197043 | A1 | 6/2019 | Rajendran et al. | |
| 2020/0264153 | A1* | 8/2020 | Ravansari | G01N 23/223 |
| 2023/0214925 | A1* | 7/2023 | Cella | G06Q 20/367 705/37 |

OTHER PUBLICATIONS

Andrienko, N., et al., Viewing visual analytics as model building. In Computer Graphics Forum, vol. 37, pp. 275-299. Wiley Online Library, 2018.
Bakr N. and El-Ashry S. M.: Organic matter determination in arid region soils: loss-on-ignition versus wet oxidation. Communications in soil science and plant analysis 49, 20 (2018), 2587-2601.
Behrisch M., et al., Quality metrics for information visualization. Computer Graphics Forum 37, 3 (2018), 625-662.
Bertini, E., et al., Quality metrics in high-dimensional data visualization: An overview and systematization. IEEE Transactions on Visualization and Computer Graphics, 17(12):2203-2212, 2011.
Bostock M., et al., D3 data-driven documents. IEEE transactions on visualization and computer graphics 17, 12 (2011), 2301-2309.
Brewka, G., et al., Answer set programming at a' glance. Commun. ACM, 54(12):92-103, Dec. 2011.
Brown, E. T., et alDis-function: Learning distance functions interactively. In 2012 IEEE Conference on Visual Analytics Science and Technology (VAST), pp. 83-92, Oct. 2012.
Cameron A. C. and Windmeijer F. A.: An r-squared measure of goodness of fit for some common nonlinear regression models. Journal of econometrics 77, 2 (1997), 329-342.
Casner, S.M . . . Task-analytic approach to the automated design of graphic presentations. ACM Transactions on Graphics (ToG), 10(2):111-151, 1991.
Ceneda D., et al., Characterizing guidance in visual analytics. IEEE Transactions on Visualization and Computer Graphics 23, 1 (Jan. 2017), 111-120.
Chakraborty S., et al., Semiquantitative Evaluation of Secondary Carbonates via Portable X-ray Fluorescence Spectrometry. Soil Science Society of America Journal 81, 4 (2017), 844.
Collins C., et al., Guidance in the human machine analytics process. Visual Informatics 2, 3 (2018), 166-180.
Curi N., et al., Tracing tropical soil parent material analysis via portable X-ray fluorescence (pXRF) spectrometry in Brazilian Cerrado. Geoderma 337, Oct. 2018 (2018), 718-728.
Dang, T.N., et al., TimeSeer: Scagnostics for high-dimensional time series. IEEE Trans. Vis. Comput. Graph. 19, 3 (Mar. 2013), 470-483.
Dang, T.N. and L. Wilkinson. Timeexplorer: Similarity search time series by their signatures. In International Symposium on Visual Computing, pp. 280-289. Springer, 2013.
Dang, T.N. and L. Wilkinson: Scagexplorer: Exploring scatterplots by their scagnostics. In 2014 IEEE Pacific Visualization Symposium (Mar. 2014), pp. 73-80.

Dang, T.N. and L. Wilkinson: Transforming scagnostics to reveal hidden features. IEEE Transactions on Visualization and Computer Graphics 20, 12 (Dec. 2014), 1624-1632.
Dasgupta, A. and R. Kosara. Pargnostics: Screen-space metrics for parallel coordinates. IEEE Transactions on Visualization & Computer Graphics, (6):1017-1026, 2010.
Dibia, V. and C,. Demiralp. Data2vis: Automatic generation of data visualizations using sequence-to-sequence recurrent neural networks. arXiv preprint arXiv:1804.03126, 2018.
Dou, W., et al., Recovering reasoning processes from user interactions. IEEE Computer Graphics and Applications, 29 (3):52-61, May 2009.
Fischer, F., et al. ClockMap: Enhancing Circular Treemaps with Temporal Glyphs for Time-Series Data. In M. Meyer and T. Weinkaufs, eds., EuroVis—Short Papers, 2012.
Fu, L., Implementation of three-dimensional scagnostics. Master's thesis, University of Waterloo, Department of Mathematics, 2009.
Fu W., et al., Outlier identification of soil phosphorus and its implication for spatial structure modeling. Precision agriculture 17, 2 (2016), 121-135.
Gabriel, K. R., The biplot graphic display of matrices with application to principal component analysis. Biometrika, 58 (3):453-467, 1971.
Good, N., et al., Combining collaborative filtering with personal agents for better recommendations. In AAAI/IAAI, pp. 439-446, 1999.
Gotz, D. and M. X. Zhou. Characterizing users visual analytic activity for insight provenance. In 2008 IEEE Symposium on Visual Analytics Science and Technology, pp. 123-130, Oct. 2008.
Guyon I. and Elisseeff A.: An introduction to variable and feature selection. J. Mach. Learn. Res. 3 (Mar. 2003), 1157-1182.
Heer, J., et al., Creation and collaboration: Engaging new audiences for information visualization. In Information Visualization, pp. 92-133. Springer, 2008.
Hintze J. L. and Nelson R. D.: Violin plots: a box plot-density trace synergism. The American Statistician 52, 2 (1998), 181-184.
Hochheiser, H. and B. Shneiderman. Dynamic query tools for time series data sets: Timebox widgets for interactive exploration. Information Visualization, 3(1):1-18, Mar. 2004. P. T. Inc. Collaborative data science, 2015.
Jaing, M. F., et al. Two-phase clustering process for outliers detection. Pattern Recogn. Lett., 22(6-7):691-700, May 2001.
Kaur, P. and M. Owonibi, A review on visualization recommendation strategies. Proceedings of the 12th International Joint Conference on Computer Vision, Imaging and Computer Graphics Theory and Applications (VISIGRAPP 2017), pp. 266-273.
Keim, D. A., Information visualization and visual data mining. IEEE Transactions on Visualization & Computer Graphics, (1):1-8, 2002.
Keim D. A., et al., Information visualization: Scope, techniques and opportunities for geovisualization. In Exploring Geovisualization, Dykes J., (Ed.). Elsevier, Oxford, 2004, pp. 1-17.
Koop, D., et al., Viscomplete: Automating suggestions for visualization pipelines. IEEE Transactions on Visualization and Computer Graphics, 14(6):1691-1698, 2008.
Mackinlay, J., et al., Show me: Automatic presentation for visual analysis. IEEE Transactions on Visualization and Computer Graphics, 13(6):1137-1144, Nov. 2007. doi: 10.1109/TVCG.2007.70594.
McGladdery C., et al., Elemental assessment of vegetation via portable x-ray fluorescence (pxrf) spectrometry. Journal of Environmental Management 210 (2018), 210-225.
Moritz, D. et al., Formalizing visualization design knowledge as constraints: Actionable and extensible models in draco. IEEE Trans. Visualization & Comp. Graphics (Proc. InfoVis), 2019.
Mutlu, B., et al., Recommending personalized visualizations. ACM Transactions on Interactive Intelligent Systems (TiiS), 6(4):31, 2016.
Nagelkerke N. J. D.: A Note on a General Definition of the Coefficient of Determination Miscellanea A note on a general definition of the coefficient sf determination. 691-692.
Nazemi, K., et al., Adaptive semantic visualization for bibliographic entries. In International Symposium on Visual Computing, pp. 13-24. Springer, 2013.

(56) References Cited

OTHER PUBLICATIONS

Palmas, G., et al., An edge-bundling layout for interactive parallel coordinates. In 2014 IEEE Pacific Visualization Symposium, pp. 57-64, Mar. 2014.
Pamula, R., et al. An outlier detection method based on clustering. In 2011 Second International Conference on Emerging Applications of Information Technology, pp. 253-256, Feb. 2011.
Paulette L., et al., Rapid assessment of soil and contaminant variability via portable x-ray fluorescence spectroscopy: Copsa Mica, Romania. Geoderma 243-244 (2015), 130-140.
Pike, W. A., et al. The science of interaction. Information Visualization, 8(4):263-274, 2009.
Roberts J. C.: State of the art: Coordinated multiple views in exploratory visualization. In Fifth International Conference on Coordinated and Multiple Views in Exploratory Visualization (CMV 2007) (Jul. 2007), pp. 61-71.
Rossel R. V., et al., Visible, near infrared, mid infrared or combined diffuse reflectance spectroscopy for simultaneous assessment of various soil properties. Geoderma 131, 1 (2006), 59-75.
Roth, S. F., et al., Interactive graphic design using automatic presentation knowledge. In Proceedings of the SIGCHI conference on Human factors in computing systems, pp. 112-117. ACM, 1994.
Roth, S. F. and J. Mattis. Data characterization for intelligent graphics presentation. In Proceedings of the SIGCHI Conference on Human Factors in Computing Systems, pp. 193-200. ACM, 1990.
Satyanarayan, A., et al. Vega-lite: A grammar of interactive graphics. IEEE Transactions on Visualization and Computer Graphics, 23(1):341-350, 2017.
Schulz, H.-J., et al., A design space of visualization tasks. IEEE Transactions on Visualization and Computer Graphics, 19(12):2366-2375, 2013.
Seo, J. and B. Shneiderman. A rank-by-feature framework for unsupervised multidimensional data exploration using low dimensional projections. In Information Visualization, 2004. INFOVIS 2004. IEEE Symposium on, pp. 65-72. IEEE, 2004.
Sievert C., et al., plotly: Create interactive web graphics via 'plotly.js. R package version 4, 1 (2017).
Silva, L. R. G., et al., Soil weathering analysis using a portable X-ray fluorescence (PXRF) spectrometer in an Inceptisol from the Brazilian Cerrado. Applied Clay Science 162, June (2018), 27-37.
Snedecor G. and Cochran W.: The sample correlation coefficient r and properties of r. Statistical Methods (1980), 175-178.
Staff S. S.: Soil Taxonomy, A Basic System of Soil Classification for Making and Interpreting Soil Surveys. Soil Science 123, 4 (2006), 270.
Stockmann U., et al., Utilizing portable X-ray fluorescence spectrometry for infield investigation of pedogenesis. Catena 139 (2016), 220-231.
Stolte, C., et al. Polaris: A system for query, analysis, and visualization of multidimensional relational databases. IEEE Transactions on Visualization and Computer Graphics, 8(1):52-65, 2002.
Su, X. and T. M. Khoshgoftaar. A survey of collaborative filtering techniques. Advances in artificial intelligence, 2009, 2009.
Van Beers W.: Kriging metamodeling in discrete-event simulation: an overview. In Proceedings of the 37th conference on Winter simulation (2005), Winter Simulation Conference, pp. 202-208.
Vartak, M., et al., Towards visualization recommendation systems. ACM SIGMOD Record, 45(4):34-39, 2017.
Voigt, M., et al., Using expert and empirical knowledge for context-aware recommendation of visualization components. Int. J. Adv. Life Sci, 5:27-41, 2013.
Wall, E., et al. "Four perspectives on human bias in visual analytics." Cognitive biases in visualizations. Springer, Cham, 2018. 29-42.
Wall, E., et al., Warning, bias may occur: A proposed approach to detecting cognitive bias in interactive visual analytics. In 2017 IEEE Conference on Visual Analytics Science and Technology (VAST), pp. 104-115, Oct. 2017.
Wang D., et al., Synthesized use of VisNIR DRS and PXRF for soil characterization: Total carbon and total nitrogen. Geofisica Internacional 243 (Apr. 2015), 157-167.
Watanabe, K., et al. Biclustering multivariate data for correlated subspace mining. In Visualization Symposium (PacificVis), 2015 IEEE Pacific, pp. 287-294. IEEE, 2015.
Weindorf, D.C., et al., Enhanced Pedon Horizonation Using Portable X-ray Fluorescence Spectrometry. Soil Science Society of America Journal 76, 2 (2012), 522.
Weindorf D. C., et al., Advances in portable X-ray fluorescence (PXRF) for environmental, pedological, and agronomic applications, vol. 128. Elsevier, 2014.
Weindorf D. C.; et al., Simultaneous assessment of key properties of arid soil by combined pxrf and vis-nir data. European Journal of Soil Science 67, 2 (2016), 173-183.
Wesseling J. G., et al., A software tool to visualize soil moisture dynamics of an irregular-shaped profile. Computers and Geosciences 60 (2013), 51-57.
Wilkinson, L., et al., Graph-theoretic scagnostics. In Proceedings of the IEEE Information Visualization 2005 (2005), IEEE Computer Society Press, pp. 157-164.
Wilkinson, L., et al., High-dimensional visual analytics: Interactive exploration guided by pairwise views of point distributions. IEEE Transactions on Visualization and Computer Graphics 12, 6 (2006), 1363-1372.
Wilkinson, L.: Visualizing big data outliers through distributed aggregation. IEEE transactions on visualization and computer graphics (2017).
Wongsuphasawat, K., et al. Voyager: Exploratory analysis via faceted browsing of visualization recommendations. EEE Transactions on Visualization & Computer Graphics, (1):1-1, 2016.
Wongsuphasawat, K., et al. Voyager 2: Augmenting visual analysis with partial view specifications. In Proceedings of the 2017 CHI Conference on Human Factors in Computing Systems, pp. 2648-2659. ACM, 2017.
Yang, J., et al., Value and relation display for interactive exploration of high dimensional datasets. In Proceedings of the IEEE Symposium on Information Visualization, INFOVIS '04, pp. 73-80. IEEE Computer Society, Washington, DC, USA, 2004.
Yates, A., et al., Visualizing multidimensional data with glyph sploms. In Computer Graphics Forum, vol. 33, pp. 301-310. Wiley Online Library, 2014.
Zhang C., et al., Outlier identification and visualization for pb concentrations in urban soils and its implications for identification of potential contaminated land. Environmental Pollution 157, 11 (2009), 3083-3090.
Zhu Y., et al., Characterizing soils using a portable X-ray fluorescence spectrometer: 1. Soil texture. Geoderma 167-168 (2011), 167-177.
International Search Report and Written Opinion for PCT?US2020/050313 dated Dec. 21, 2020.

* cited by examiner (a)

(b)

DATA VISUALIZATION DEVICE AND METHOD

CROSS-REFERENCE TO RELATED APPLICATIONS

This application is the U.S. National Phase application of PCT application no. PCT/US2020/050313 filed on Sep. 11, 2020 and entitled "Data Visualization Device and Method", which claims priority to U.S. provisional patent application Ser. No. 62/900,688 filed on Sep. 16, 2019. The entire contents of the foregoing patent applications are hereby incorporated by reference.

STATEMENT OF FEDERALLY FUNDED RESEARCH

Not applicable.

TECHNICAL FIELD OF THE INVENTION

The present invention relates in general to the field of data analysis. In particular, the present invention relates to devices and methods for data visualization.

BACKGROUND OF THE INVENTION

Without limiting the scope of the invention, its background is described in connection with data visualization techniques.

Data visualizations are graphical representations to communicate patterns and insights with "clarity, precision and efficiency" that otherwise are not easy to derive from the data due to its sizes and complexity. Computer generated representations have started with an imperative approach. It requires significant programming skills and effort and therefore dedicated for experts (e.g., Ph.D. statisticians, computer scientists, analysts) who can provide instructions down to the final detail on how to arrive their expected visual representation. In contrast, interactive tools provide ease of use and speed in creating standard graphs based on pre-defined templates or even simple drag and drop, but offer limited expressiveness and customization.

Over the years, visualization has been considered as an effective and efficient way to convey information. Its advantages have given birth to y visual software, plug-in, tools or supporting libraries [5, 32, 49]. Tools have their own audiences and playing fields and they all share common characteristics, that is, no tool fits for all purposes. At this point, it is a challenging task for analysts to select the proper visualization tools to meet their needs, even for data domain knowledge experts because of the ineffective data layout design. This problem becomes more challenging for inexperienced users who are not trained with graphical design principles to choose which visualization is best suited for their given tasks.

FIG. 1 illustrates an example of the available visualization tools 100 in which tools for novices (on the left; Interactive 102) are faster to create visualizations while tools for experts (on the right; Imperative 104) are more expressive. Declarative specification grammars 106, such as Vega [49], Plotly [32], D3 [5], and ggplot2 [59], provide a trade-off between speed and expressivity. Analysts must manually select a subset of variables and then choose which statistical computations/transformation and associated visual encodings to apply for each resulting variable set. Making visual encoding decisions while exploring unfamiliar data is non-trivial, especially for non-expert users. These decisions often involve both domain and visualization design expertise and may impose a tedious specification process that hinders exploration [64]. Automatically-generated visualizations can alleviate the issue.

In particular, researchers tackle this problem by providing a visualization recommendation system (VRS) [10, 36, 52] that assists analysts in choosing an appropriate presentation of data. When designing a VRS, designers often focus on some factors [54] that are suitable in specific settings. One common factor is based on data characteristics in which data attribute is taking into consideration, one example of this approach was presented by Mackinlay et al. in Show Me [37]. This embedded Tableau's commercial visual analysis system automatically suggests visual representations based on selected data attributes. The task-oriented approach was studied in [10, 48] where users' goals and tasks are the primary focus. Roth and Mattis [48] pioneered of integrating users' information seeking goals into the visualization design process. Another factor is based on users' preferences in which the recommendation system automatically generates visual encoding charts according to perceptual guidelines [41].

To solve the "curse of dimensionality", there exists three typical methods [51] to reduce data dimension. The first method is through axis-parallel projection where one variable is used as the horizontal axis, and another dimension is projected on the plane as vertical. This method does not scale well as the number of dimensions increases (i.e., a total of $$\frac{n*(n-1)}{2}$$

combinations, where n is the number of dimensions), leading to an overwhelming amount of options for users. When faced with many options, it is an arduous task to choose which features to explore, especially for inexperienced users. The second method involves the use of a linear/nonlinear combination of dimensions for an axis. Principal Component Analysis (PCA) and Multidimensional Scaling (MDS) are the two most common techniques for this method. However, the downside of this method is that users often suffer from understanding the meaning of each axis when they try to interpret the visual encodings into meaningful knowledge. And the last method is to use axes that are selected from any variables or feature. A typical technique for this method is found in parallel coordinate where each variable is represented by a vertical line, and these lines are aligned sequentially. However, the limitation of this approach is the overlaying of data lines for similar data values among observations. Many studies have been conducted based on these methods to find an interesting feature or a set of features for data exploration and focused data analysis. For data exploration task, the question of which features to look beforehand remains unsolved. Even when features are ranked or ordered, users lack reasoning why those features are classified intuitively. This type of question has not fully explored and investigated so far.

An exploratory visual analysis is involving both open-ended explorations of visual patterns [11] and concept-driven analysis when analysts have existing models or hypotheses [2, 30]. The most challenging job for analysts to do their visual analysis task is the choice of which visual encoding to go through because the design space of possible visual representations is so huge [40]. Mackinlay et al. [37] proposed an embedded user interface command and defaults, called Show Me, into the Tableau visual analysis system. Show Me derives the advantage of a specification language VizQL [27] which was originally developed for Polaris [52], an interface for exploring large multi-dimensional databases, to automatically present data as small multiple displays. The most interesting idea of this research is that data presentation is ranked based on its associated conditions and the default view will suggest the visual encoding with the highest ranked command. This suggestion layout helps users focus on their data analysis and task rather than thinking of graphical design on the user interface. Nazemi et al. [42] used the bottom-up approach to continuously collect user's interactions through usage profiles of a given chart then the system suggested visualizations based on user preferences collected from user profiles. However, their work mainly focused on digital libraries such as bibliographical notes and publications.

Taking a similar approach, Mutlu et al. proposed and developed VizRec [41] to automatically create and suggest personalized visualizations based on perceptual guidelines. The goal of VizRec is that it allows users to select suggested visualizations without interrupting their analysis workflow. Having this goal in mind, VizRec tried to predict the choice of visual encoding by investigating available information that may be an indicator to reduce the number of visual combinations. Collaborative filtering technique [24, 53] was utilized to estimate various aspects of the suggested quality charts. The idea of collaborative filtering is to gather users' preferences through either explicitly Likert rating scale 1-7 given by a user or implicitly collected from users' behavior. The limitation of this study is whether users are willing to give their responses on tag/rating for ranking visualization because these responses were collected via a crowd-sourced study which in turns lack control over many conditions. Another approach based on rule-based system was presented by Voigt et al. [53]. Based on the characteristics of given devices, data properties and tasks, the system provides ranked visualizations for users. The key idea of this approach is to leverage annotation in semantic web data to construct the visualization component. However, this annotation requires users to annotate data input manually, which leads to the limitation of this approach. In addition, this work is lacking in supporting the empirical study. A similar approach to this study was found in the study [41].

Manual chart specification tools support question answering, but they are often tedious for early-stage exploration as analysts may lack exposure to the shape and structure of their data [52]. Manual view specification is adopted by many popular visualization tools [47, 60]. Earlier techniques for automated design and visualization recommendation are based on rules and heuristics [37]. The Data2Vis [17] learns how to create visualization specifications from a corpus of Vega-Lite visualizations [49] without retorting to an enumeration of rules or heuristics, by training a multilayered attention-based recurrent neural network (RNN) with long short-term memory (LSTM). Voyager [64] seeks to complement manual chart construction with interactive navigation of a gallery of automatically-generated visualizations. These systems support faceting into trellis plots, layering, and arbitrary concatenation.

As the number of dimensions grows, browsable gallery [64,65] and sequential navigation [17] do not scale. The problem gets worst when users want to inspect the correlation of variables in high dimensional space: the number of possible pairwise correlations grows exponentially to the number of dimensions. A good strategy is to focus on a subset of visual presentations prominent on certain visual characterizations [55] that users might interest and a focus and context interfaces charts (of glyph or thumbnails) for users to select from. Most recently, Draco [39] uses a formal model that represents visualizations as a set of logical facts and enforces design guidelines as a collection of hard and soft constraints over these logical facts. The visual recommendation is now formulated as a constraint-based problem to be resolved using Answer Set Programming [6]. In particular, Draco searches for the visualizations that satisfy the hard constraints and optimize the soft constraints.

Accordingly, there is a need for devices and methods for improved data visualization.

SUMMARY OF THE INVENTION

Visualizations are context-specific. To understand the context of visualizations before deciding to use them is a daunting task since users have various expertise/backgrounds and there are thousands of available visual representations (and their variances). To this end, a visual analytics framework may seek to achieve the following goals: (1) to automatically generate a number of suitable representations for visualizing the input data and present it to users as a catalog of visualizations with different levels of abstractions and data characteristics on one/two/multi-dimensional spaces; (2) to infer aspects of the user's interest, background knowledge, reasoning process, and cognitive style based on the user's interactions; and (3) to narrow down a smaller set of visualizations that suit users analysis intention. The results of this process gives the analytics system the means to better understand the user's analysis process and enables it to better provide timely recommendations.

In one embodiment, an apparatus includes an input/output interface, a memory, a display communicably coupled to the input/output interface, and one or more processors communicably coupled to the input/output interface and the memory. The one or more processors receive a data set having two or more variables, receive a selection of at least one of the two or more variables, an abstraction level and a visual feature, automatically generate and display a set of visual representations of the data set on the display based on the selected variable(s), selected abstraction level and the selected visual feature, wherein each selected variable is represented as a dimension and the set of visual representations comprise at least a guided navigation view, a focus view and an expanded view, receive a change in the selected variables, selected abstraction level, the selected visual feature, or a selection from the guided navigation view, the focus view or the expanded view, determine a visual representation recommendation based on the selected variable(s), selected abstraction level and the selected visual feature, the change in the selected variables, selected abstraction level, the selected visual feature, or the selection from the guided navigation view, the focus view or the expanded view, and automatically update and display the set of visual representations of the data set on the display based the visual representation recommendation, and the change in the selected variables, selected abstraction level, the selected visual feature, or the selection from the guided navigation view, the focus view or the expanded view.

In one aspect, the selected abstraction level comprises a default abstraction level; or the selected visual feature comprises a default visual feature or a stored visual feature. In another aspect, the selected abstraction level comprises individual instances, regular binning, data-dependent binning or abstracted; and the selected visual feature comprises outlier, variance, multimodality, skewness, skinny, striated, stringy, monotonic, convex, clumpy, parallelism, angles of crossing, correlation, line crossings, pixel-based entropy, convergence or over-plotting. In another aspect, the set of visual representations further comprise, an overview or an exemplar view. In another aspect, the one or more processors store the visual representation recommendation in a user profile. In another aspect, the visual abstraction level comprises individual data points, regular binning, data-dependent binning or abstracted/grouped data; and the visual feature comprising outlying, multi-moded, skewness or principal component(s). In another aspect, the one or more processors repeat receiving the change, determining the visual representation recommendation, and automatically updating and displaying the set of visual representations of the data set. In another aspect, the set of visual representations are defined by a catalog of visualizations. In another aspect, the visual representation recommendation narrows down a smaller set of visualizations that suit a user's analysis. In another aspect, the one or more processors: generate a raw data set using one or more sensors; pre-process the raw data; calculate one or more statistics based on the pre-processed data; interpolate the statistics and/or the pre-processed data; and create the data set based on the interpolated data, the statistics and/or the pre-processed data. In another aspect, the apparatus is portable. In another aspect, the data set comprises a soil data set. In another aspect, the set of visual representations of the data set comprise one or more of a correlation graph, a contour map, a heatmap, a box-plot or a goodness-of-fit graph.

In another embodiment, a computerized method for providing a visual representation of a data set includes: providing a device having an input/output interface, one or more processors, a memory and a display communicably coupled to the input/output interface; receiving a data set having two or more variables; receiving a selection of at least one of the two or more variables, an abstraction level and a visual feature; automatically generating and displaying a set of visual representations of the data set on the display that are based on the selected variable(s), selected abstraction level and the selected visual feature, wherein each selected variable is represented as a dimension and the set of visual representations comprise at least a guided navigation view, a focus view and an expanded view; receiving a change in the selected variables, selected abstraction level, the selected visual feature, or a selection from the guided navigation view, the focus view or the expanded view; determining a visual representation recommendation based on the selected variable(s), selected abstraction level and the selected visual feature, the change in the selected variables, selected abstraction level, the selected visual feature, or the selection from the guided navigation view, the focus view or the expanded view; and automatically updating and displaying on the display the set of visual representations of the data set on the display based the visual representation recommendation, and the change in the selected variables, selected abstraction level, the selected visual feature, or the selection from the guided navigation view, the focus view or the expanded view.

In one aspect, the selected abstraction level comprises a default abstraction level; or the selected visual feature comprises a default visual feature or a stored visual feature. In another aspect, the selected abstraction level comprises individual instances, regular binning, data-dependent binning or abstracted; and the selected visual feature comprises outlier, variance, multimodality, skewness, skinny, striated, stringy, monotonic, convex, clumpy, parallelism, angles of crossing, correlation, line crossings, pixel-based entropy, convergence or over-plotting. In another aspect, the set of visual representations further comprise, an overview or an exemplar view. In another aspect, the method further comprises storing the visual representation recommendation in a user profile. In another aspect, the visual abstraction level comprises individual data points, regular binning, data-dependent binning or abstracted/grouped data; and the visual feature comprising outlying, multi-moded, skewness or principal component(s). In another aspect, the method further comprises repeating the receiving the change, determining the visual representation recommendation, and automatically updating and displaying the set of visual representations of the data set. In another aspect, the set of visual representations are defined by a catalog of visualizations. In another aspect, the visual representation recommendation narrows down a smaller set of visualizations that suit a user's analysis. In another aspect, the method further comprises: generating a raw data set using one or more sensors; pre-processing the raw data; calculating one or more statistics based on the pre-processed data; interpolating the statistics and/or the pre-processed data; and creating the data set based on the interpolated data, the statistics and/or the pre-processed data. In another aspect, the device is portable. In another aspect, the data set comprises a soil data set. In another aspect, the set of visual representations of the data set comprise one or more of a correlation graph, a contour map, a heatmap, a box-plot or a goodness-of-fit graph.

In another embodiment, an apparatus includes an input/output interface, a memory, a display communicably coupled to the input/output interface, and one or more processors communicably coupled to the input/output interface and the memory. The one or more processors of the apparatus receive a data set having two or more variables, receive a selection of a data visualization profile, receive a selection of at least one of the two or more variables, automatically generate and display a set of visual representations of the data set on the display based on the data visualization profile and the selected variable(s), wherein the set of visual representations of the data set comprise one or more of a correlation graph, a contour map, a heatmap, a box-plot or a goodness-of-fit graph, receive a change in the selected variables, the correlation graph, the contour map, the heatmap, the box-plot or the goodness-of-fit graph, determine a visual representation recommendation based on the selected variable(s), the change in the selected variables, the correlation graph, the contour map, the heatmap, the box-plot or the goodness-of-fit graph, and automatically update and display the set of visual representations of the data set on the display based the visual representation recommendation, and the change in the selected variables, the correlation graph, the contour map, the heatmap, the box-plot or the goodness-of-fit graph.

In one aspect, the one or more processors: generate a raw data set using one or more sensors; pre-process the raw data; calculate one or more statistics based on the pre-processed data; interpolate the statistics and/or the pre-processed data; and create the data set based on the interpolated data, the statistics and/or the pre-processed data. In another aspect, the device is portable. In another aspect, the data set comprises a soil data set.

In another embodiment, a computerized method for providing a visual representation of a data set includes: providing a device having an input/output interface, one or more processors, a memory and a display communicably coupled to the input/output interface; receiving a data set having two or more variables; receiving a selection of a data visualization profile; receiving a selection of at least one of the two or more variables; automatically generating and displaying a set of visual representations of the data set on the display based on the data visualization profile and the selected variable(s), wherein the set of visual representations of the data set comprise one or more of a correlation graph, a contour map, a heatmap, a box-plot or a goodness-of-fit graph; receiving a change in the selected variables, the correlation graph, the contour map, the heatmap, the box-plot or the goodness-of-fit graph; determining a visual representation recommendation based on the selected variable(s), the change in the selected variables, the correlation graph, the contour map, the heatmap, the box-plot or the goodness-of-fit graph; and automatically updating and displaying the set of visual representations of the data set on the display based the visual representation recommendation, and the change in the selected variables, the correlation graph, the contour map, the heatmap, the box-plot or the goodness-of-fit graph.

In one aspect, the method further comprises: generating a raw data set using one or more sensors; pre-processing the raw data; calculating one or more statistics based on the pre-processed data; interpolating the statistics and/or the pre-processed data; and creating the data set based on the interpolated data, the statistics and/or the pre-processed data. In another aspect, the device is portable. In another aspect, the data set comprises a soil data set.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which:

FIGS. 18A-18B depicts an overview of all chemical pairwise correlations in two soil profiles in which each data point is an multidimensional instance (on the 2D soil profile grid) collected via a pXRF shot in accordance with one embodiment of the present invention;

DETAILED DESCRIPTION OF THE INVENTION

Figure 1:
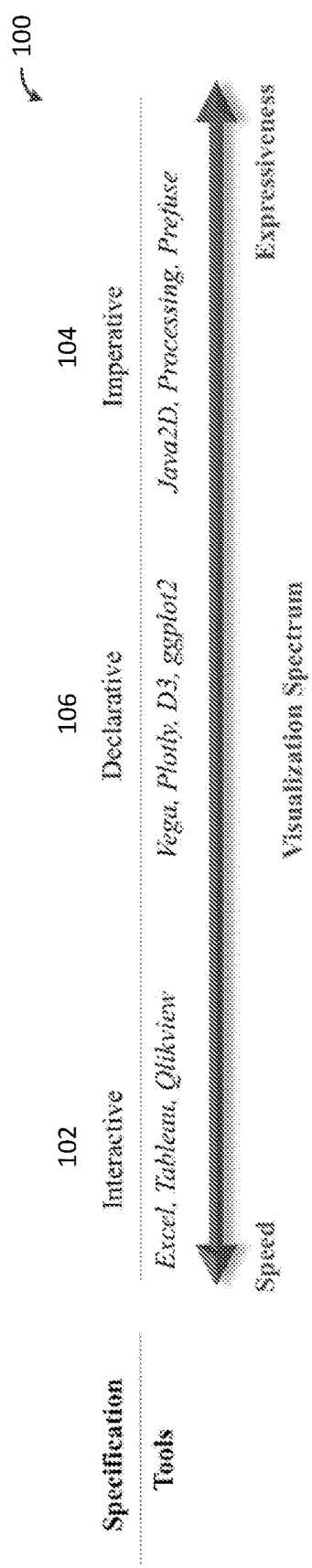
FIG. 1 depicts a visualization spectrum in accordance with the prior art.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Various embodiments of the present invention seek to address the previously described problems by providing a visualization recommendation framework called HMaViz. HMaViz is designed to work for both new and skilled users by providing them guided features extracted from a dataset with the reasoning process [8]. Thus, in one embodiment a new approach for visualization recommendation is provided that acts as a guideline for users based on features exaction. The visual framework does not rely on the science of interaction [46] or cognitive biases [56, 57], but instead relies on a recommendation system that estimates the likelihood of users' interest based on the projected dimensions in the visualization catalog.

In one embodiment, faceted views are incorporated (using the row and column encoding channels) and other customized layouts, such us biplots, force-directed layout, and scatterplot matrix, are supported to provide summary and guidance via the use of visual pattern diagnostics [51, 63] for the data exploration process [11, 12]. The framework offers personalized recommendations to help users find suitable representations and that fit their analysis [18], background knowledge [25], and cognitive style [9]. A Netflix-style recommendation estimates the likelihood of users' interest based on a number of factors including genre, categories, actors, etc. via viewing and rating history.

Figure 2A:
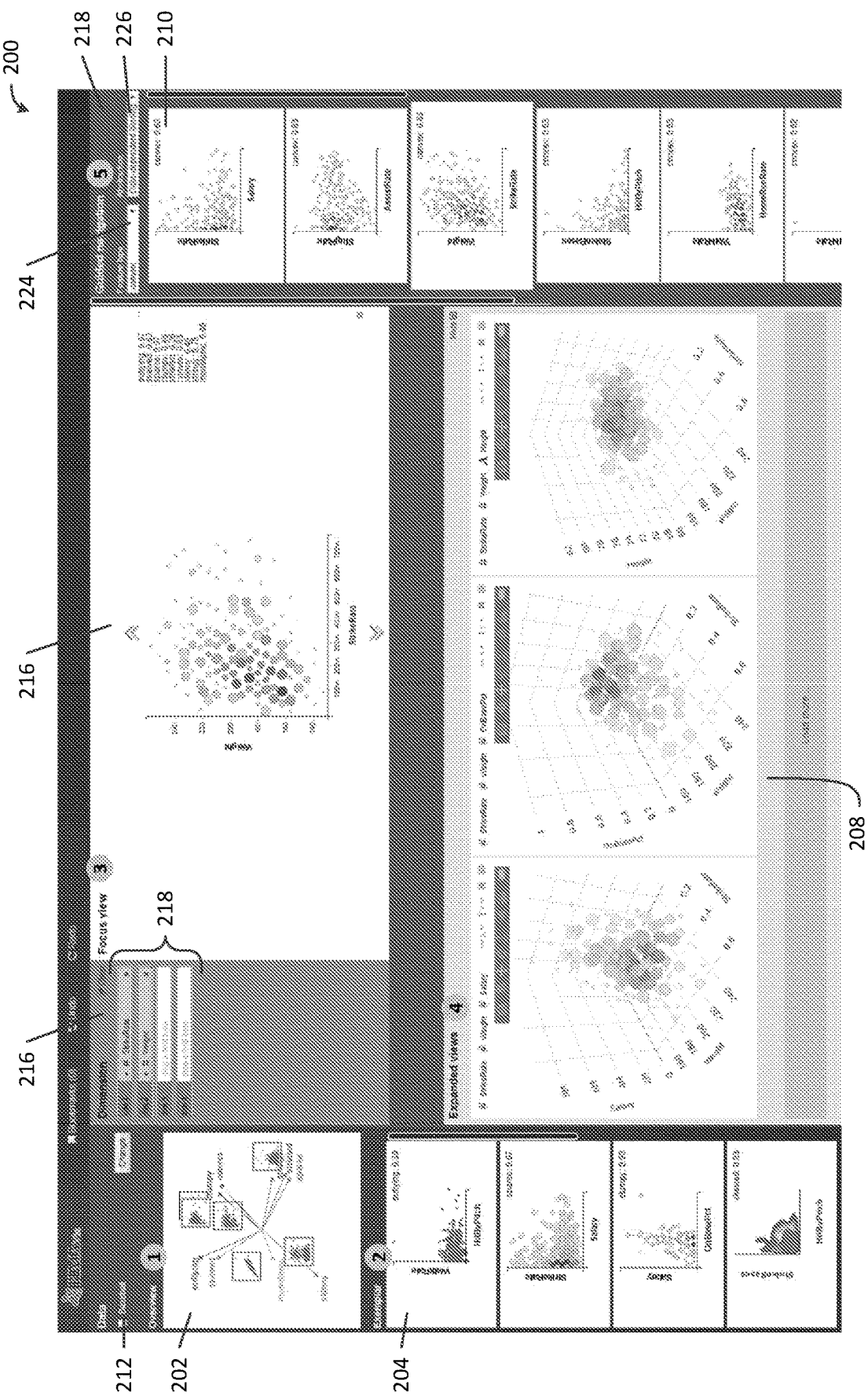
FIGS. 2A-2B are examples of a visual interface of HMaViz framework in accordance with one embodiment of the present invention.
Figure 2B:
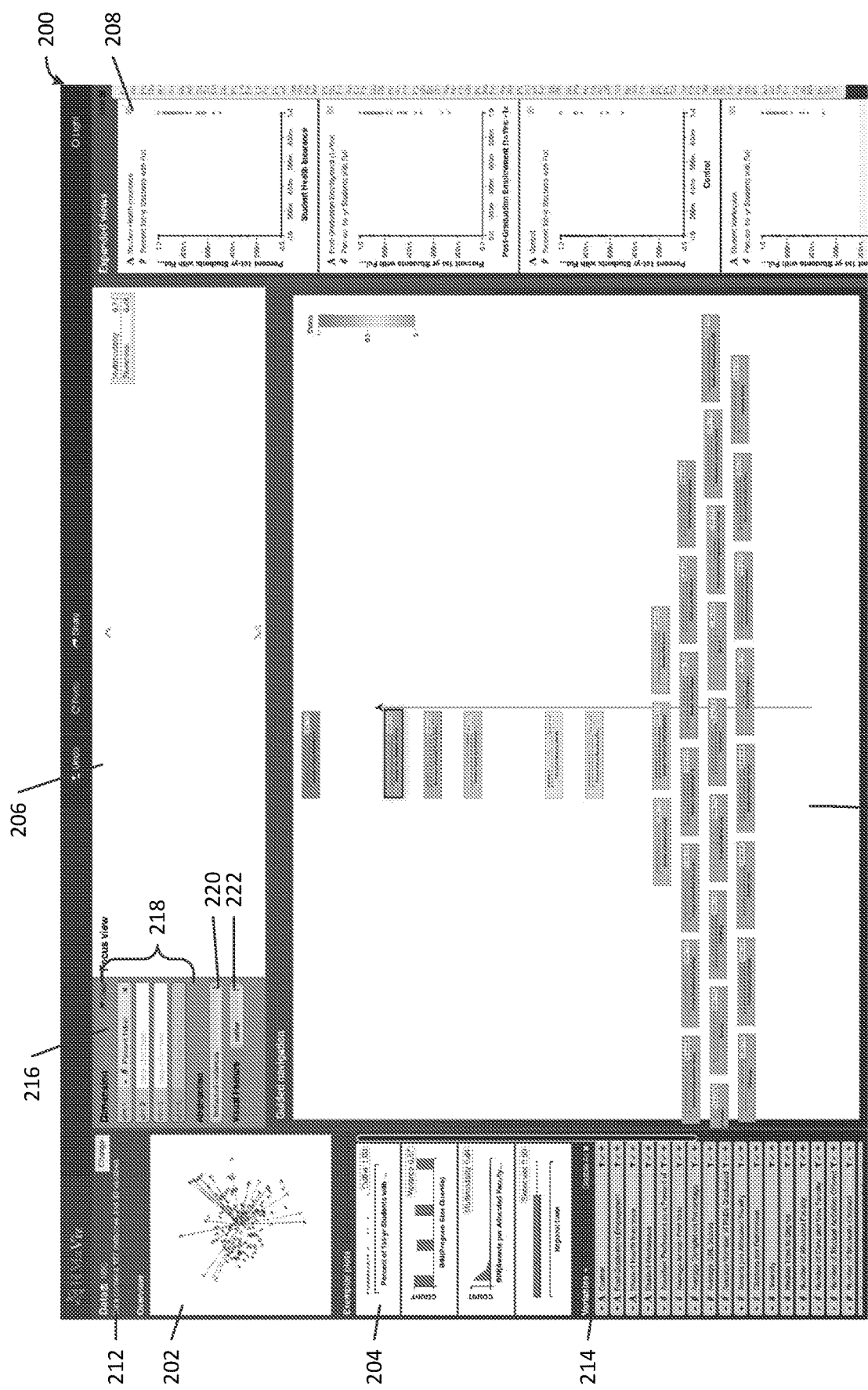

Now referring to FIGS. 2A-2B, examples of a visual interface 200 of the HMaViz framework in accordance with one embodiment of the present invention are shown. The visual interface 200 organizes data into five visual windows and includes four data manipulation areas. The five visual windows include, but are not limited to: (1) Overview window 202; (2) Exemplary plots 204; (3) Focus view 206; (4) Expanded view 208; and (5) Guided navigation panel 210. More or less windows, or different windows can be used. The four data manipulation areas include, but are not limited to: (1) data set selection 212; (2) variables list 214; (3) visual parameters 216; and (4) guided navigation parameters 218. More or less data manipulation areas, or different data manipulation areas can be used. The visual parameters 216 include, but are not limited to: (1) dimensions (i.e., number of variables) 218; (2) abstraction level 220; and (3) visual feature 222. The guided navigation parameters 218 include, but are not limited to" (1) feature type 224; and (2) abstraction level 226. More or less parameters, or different parameters can be used.

Visual analytics guidance [50] was followed to design the visualization tool, which first defines the design space to identify high-level abstract goals (e.g., exploratory analysis, confirmatory analysis, presentation). Derived from these goals, a set of tasks is built to fulfill the requirements of the visualization tool [12]. Through in-depth discussions and collaborations with experts in various domains (such as systems biologists, water resource researchers, and soil scientists), different and common characteristics and requirements in their data analysis process were identified:

CR1: Within each application domain, the same type of exploratory analysis is performed repeatedly.

CR2: Among different application domain, the types of analysis are significantly different. For example, water resource researchers care about the variance of individual measures (e.g., the dynamics of salinity or water availability). Soil scientists focus on the spatial distribution of chemical elements (therefore, heatmap is intensively used). Systems biologists need to understand the correlations of different genes responsible for different diseases.

However, they all have a common issues: CR3: the analysis process is time-consuming (may take days or weeks), CR4: involving many people with different expertise (for data collection, measurements, data representation and analysis), and CR5: using various tools (from traditional software such as Microsoft Excel, to some complicated packages such as ArcGIS and MatLab, or even programming languages such as R or Python).

The visual framework can learn the end users and personalize the visualizations for their analysis goals. The visual framework aims to make the visualization more accessible to a wider range of audience with various expertise, shorten the time from data collection to analysis results, and therefore allow on-site corrections. For example, water or soil samples can be collected in a different country and hence mistakes in data collection might not be reversible. This work includes two synergistic research tasks, together forming a novel visual analytic framework for recommending the suitable visualization. The first task focuses on an automated to generation of graphical representation and visual interfaces based on the grammar of graphics [60]. The idea of automated visualization is very straightforward: Plug in any dataset into a magic box and it spits out an effective visualization that allows users to make discoveries of patterns hidden inside the data. However, the automated visualization encounters several problems: (1) how to handle heterogeneous data types; (2) how to handle a large volume of data (e.g., how to select a subset of data that can convey user interests); and (3) how to balance between automation and user control.

A data set can be loaded by using the data selection area 212 and: (1) selecting a data set; (2) dragging and dropping a file in json of csv format into the provided area; or (3) copying and pasting the data directly into the text box and providing the data name. The variables list area 214 lists all the variables in the data set. The biplot of the data points is displayed in the overview window 202 with each axis representing a dimension in the PCA projection. A list of example 1D plots of increasing abstraction are displayed in the exemplar plots window 204. The user can start by selecting example 1D plots 204 or drag and drop one or more variables from the variables list 214 into the focus view 206. The variable of focus is plotted in the focus view 206. Now users can select a different variable in the guided navigation window 208, which is colored and ordered by a selected visual feature. In this case, outlying was chosen, therefore, the red plots on top are the ones containing outliers. There are two other ways for a user to add a new variable and extend the analysis into bivariate. First, the user can drag and drop another variable from the variables list 214 into the list of dimensions 218. Second, a user can select a recommended 2D scatter plot on the right list, which has been ordered by the outlier measure. As the new variable is loaded, all views are updated. The focused scatter plot shows the correlation between the two selected variables. The guided new view shows all pairwise combinations colored and ranked by the selected feature. The user can switch from outlier to monotonicity, the order of the variable in the matrix as well as the color will be updated accordingly. Highly correlated variables are at the top of the triangle. Users can also select a higher abstraction to reduce the rendering time. From the guided view 210, users can select a scatter plot to bring it into the focus view. Again, users can extend the analysis by selecting a recommended 3D plot or drag and drop more variables into the list 218.

Figure 3:
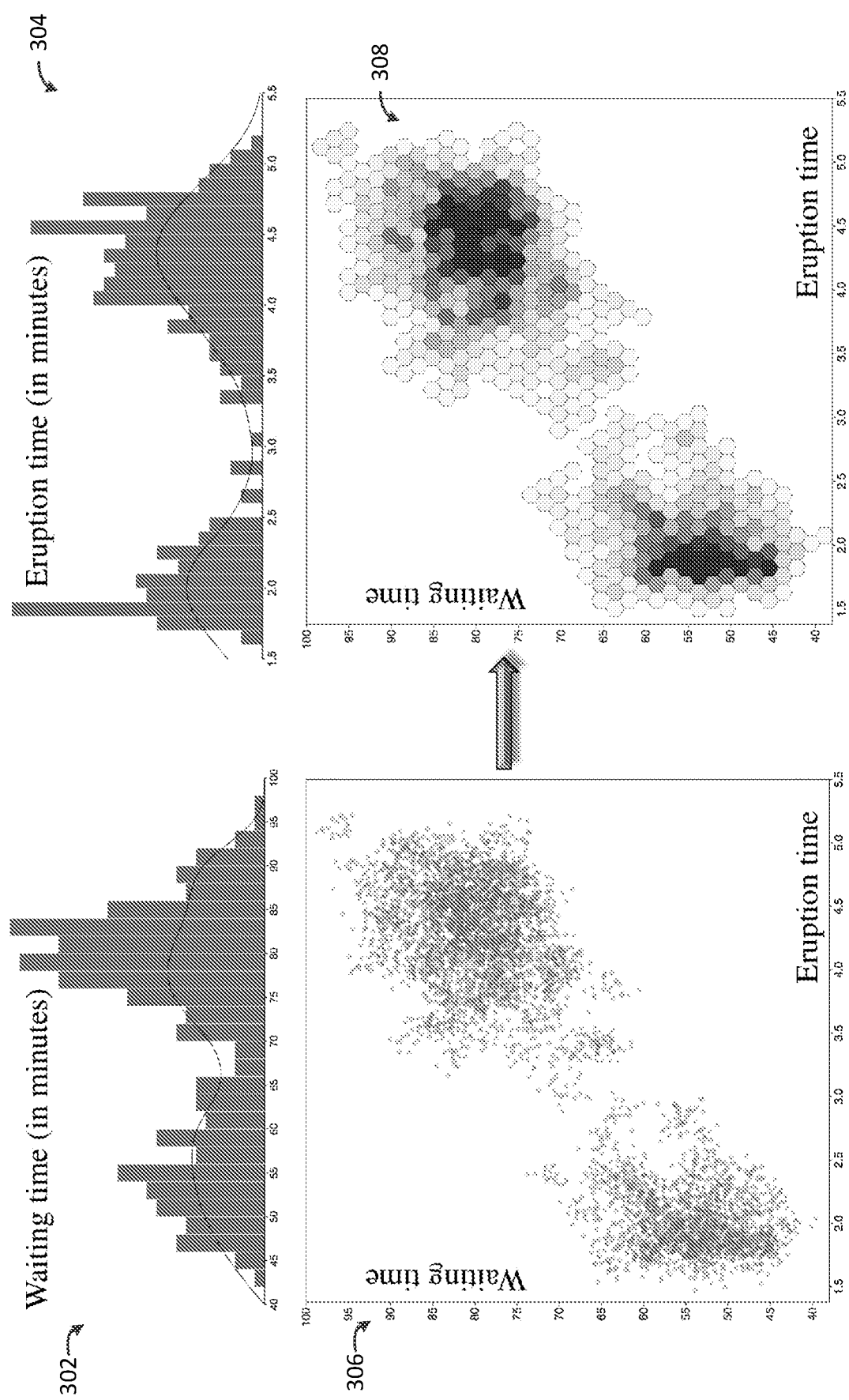
FIG. 3 depicts Old Faithful Geyser data [20]: histograms of waiting time in between two eruptions and eruption duration; and scattertplots of thousand of observations and aggregated representations in hexagon bins in accordance with one embodiment of the present invention.

Due to the constant increase of data and the limited cognitive load of humans, data aggregation [35] is commonly adopted to reduce the cost of rendering and visual feature computation expenses [3]. Data aggregation is the process of gathering information and presented in a summary form, for purposes such as statistical analysis. A common aggregation purpose is to get more information about particular groups based on specific variables such as age, profession, or income. FIG. 3 shows an example of data aggregation, namely Old Faithful Geyser data [20], on one-dimensional (302, 304) and two-dimensional (306, 308) presentations. The one-dimensional presentations (302, 304) are histograms of waiting time in between two eruptions and eruption duration. The two-dimensional presentations (306, 308) are scattertplots of thousand of observations and aggregated representations in hexagon bins. Notice that the visual features in the framework will be computed on the aggregated data, which allows us to handle large data [15]. The difference in aggregation level is illustrated in plots 306 (individual data instances plotted) and 308 (groups of data instances plotted).

Figure 4:
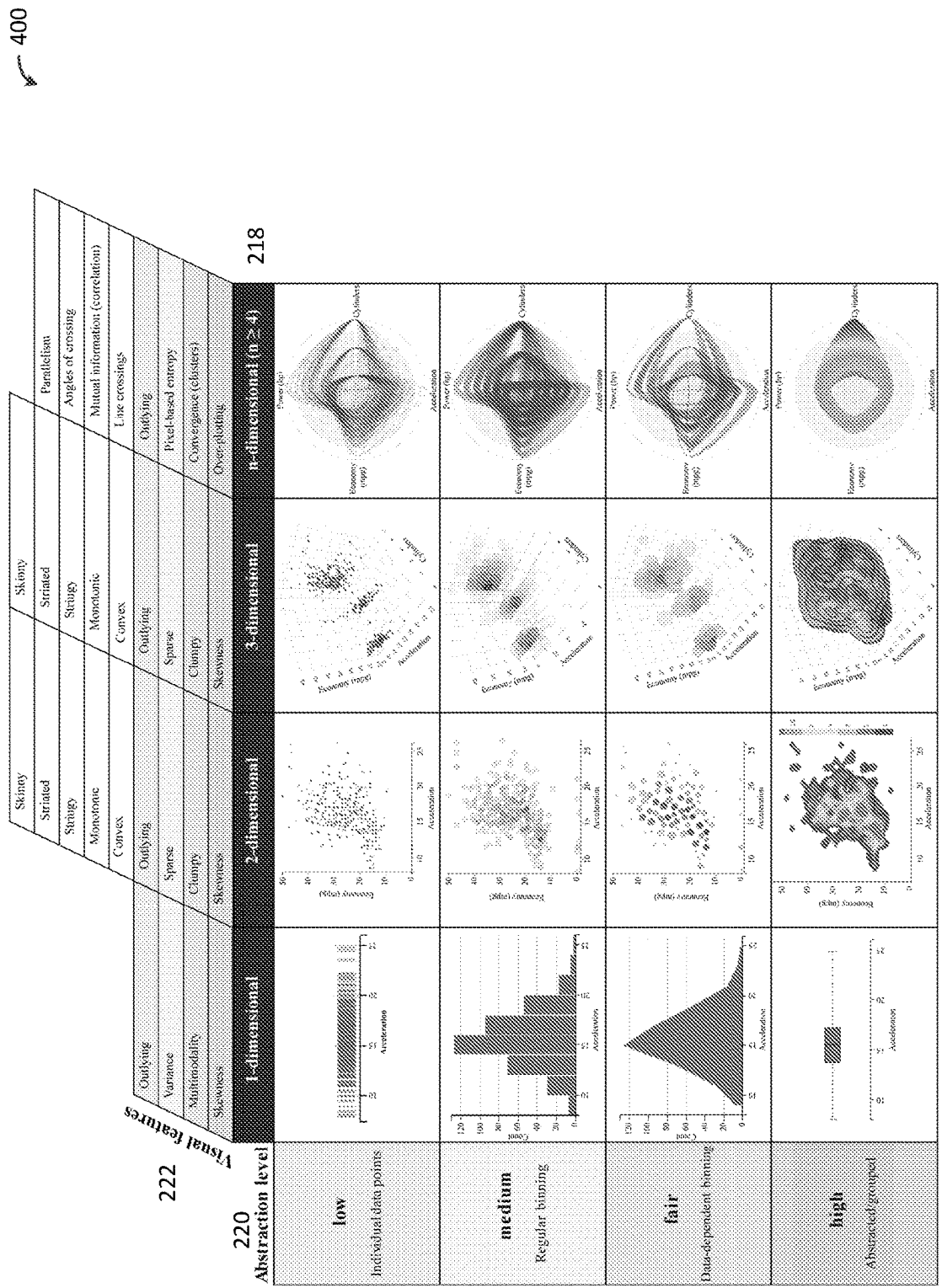
FIG. 4 depicts a HMaViz visual catalog in accordance with one embodiment of the present invention.

Referring now to FIG. 4, a HMaViz visual catalog 400 in accordance with one embodiment of the present invention is shown. More abstracted representations of the same data is shown vertically, while more complicated multivariate analysis is show horizontally. The associated visual features for each type of analysis (e.g., the feature cells) can be colored by the abstraction level if they are plotted in the HMaViz default exemplar view. In the visual framework, the users and visualizations are characterized on the following criteria within the visual parameters 216: (1) number of dimensions 218 (univariate [31], bivariate [13], and multivariate data [16, 66]); (2) visual abstraction level 220 (individual data instances (low), regular binning (medium), data-dependent binning (fair), groups [44, 45] (high), or just summary [67]); and (3) visual features or patterns 222 (trends [26], correlations [58], and outliers [29, 61]). While each of these three dimensions has been studied extensively in visual analytics field [3, 12], to the best of the inventors' knowledge, there is no existing framework that incorporate all together in human-machine analytics for visual recommendation system.

Before applying machine learning techniques or fitting any models, it is important to understand what your data look like. The system generates a diverse set of visualizations for broad initial exploration for one dimension, two dimensions, and higher dimensions. Lower dimensional visualizations, such as bar charts, box plots, and scatter plots shown in FIG. 4 are widely accessible. As the number of dimensions grows, browsable gallery [64, 65] and sequential navigation [17] does not scale well. Therefore, the visual framework provides two unique features to deal with large, complex, and high dimensional data. First, statistical-driven components are used that characterize the data distributions such as density, variance, and skewness (for 1D), shape and texture (for 1D), convergence and line crossings (for nD). Working directly with these visual characterizations, the visual framework allows users to quickly narrow down to the patterns of interest. Second, four abstraction levels are used in the Human-Machine Analytics: individual instances, regular binning, data-dependent binning, and most abstracted (such as min, max, and median). On the human side, this helps to capture their level of interest in the data (individual, groups, or overall trend). On the machine side, the framework will automatically adjust the level of abstraction in the recommended view to render the larger number of plots (can be requested by the users) as the number of views can be exponentially increased by the number of variables in the input data [38]. HMaViz attempts to facilitate exploration of high-dimensional data, which is an important issue relatively unaddressed by prior work [39].

Figure 5:
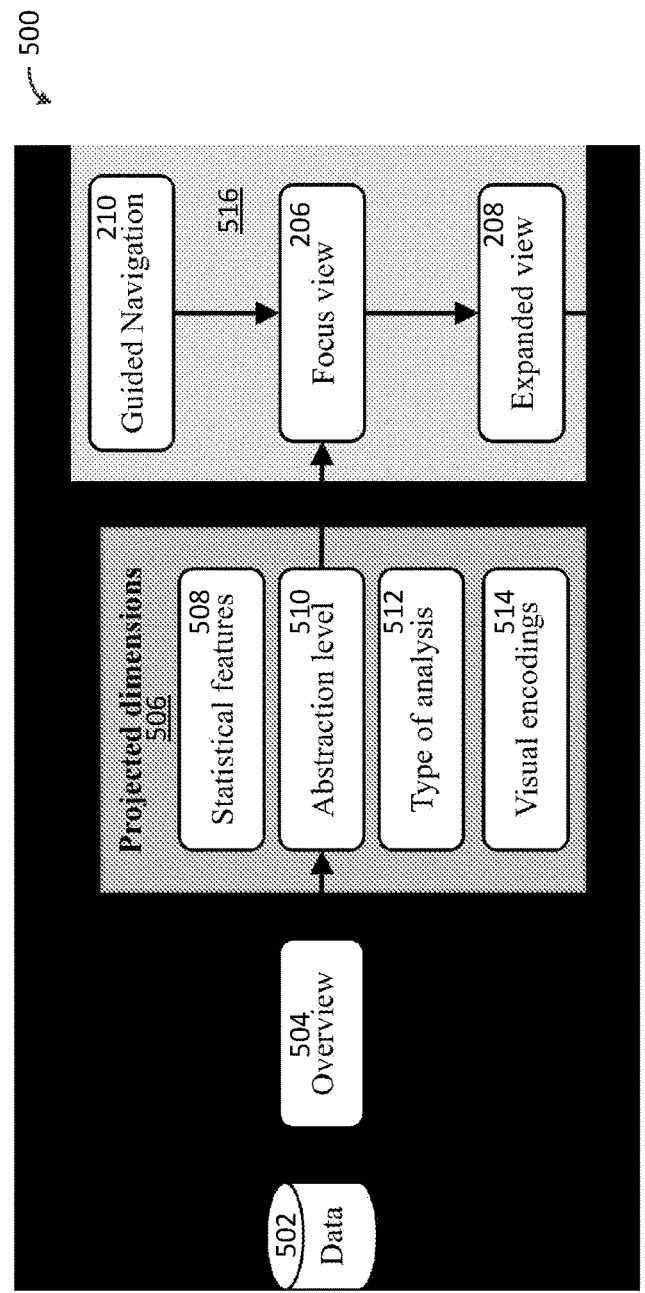
FIG. 5 is a schematic chart of HMaViz in accordance with one embodiment of the present invention.

Now referring to FIG. 5, a schematic chart 500 of HMaViz in accordance with one embodiment of the present invention is shown. After data 502 is fed into the system, the statistical-driven features are calculated and plotted on the overview panel 504. From the overview panel 504, heuristically defined initial views are shown (i.e., ticks plot, bar chart, area chart, box plot for 1D). Recommended views are projected on the four dimensions 506, such as statistical-driven features 508, abstraction level 510, type of multivariate analysis 512, and visual encodings 514, to convey users interest. Users may select to change one or more dimensions in the interface, which may lead to the partial or full updates of the recommendation interface 516. For example, if users are interested in a more abstracted representation, the guided navigation 210, focus view 206, and expanded view 208 will be updated. While increasing the number of variables in the analysis might lead to the updates of overview and exemplary plots. The visual features for the next level of analysis will be calculated as well (via another web worker/thread).

Figures 6, 7:
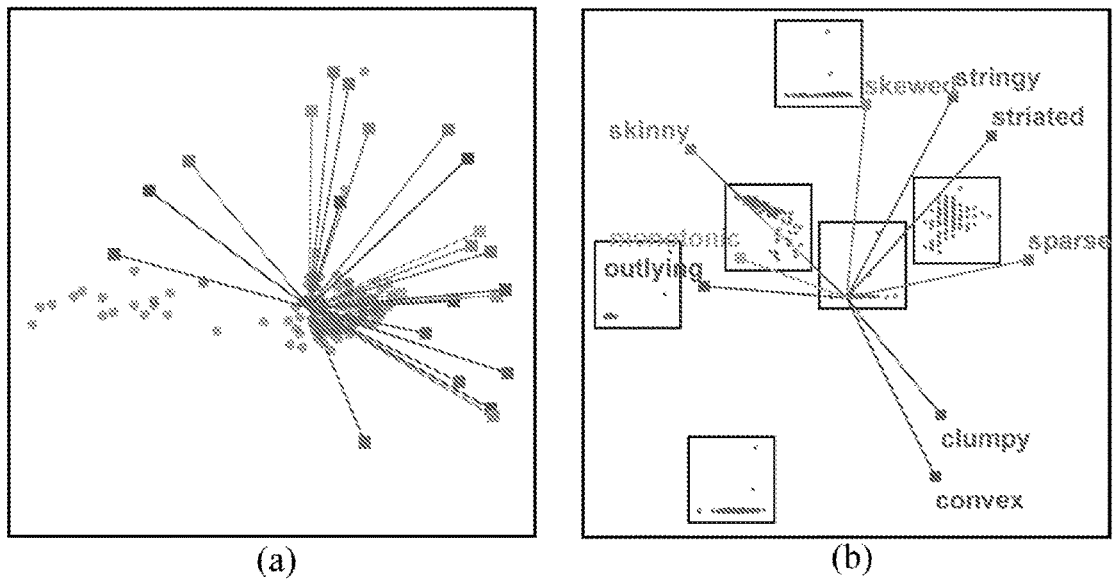
FIG. 6 depicts an overview panel of HMaViz: (a) 1D Biplot (b) 2D Biplot in accordance with one embodiment of the present invention.
FIG. 7 depicts declarative language and univariate exemplar plots for the Baseball data in accordance with one embodiment of the present invention.

Referring now to FIG. 6, overview panels of HMaViz are depicted in accordance with one embodiment of the present invention. Display (a) summarizes the input data in the form of Biplots [22] chart which allows users to explore both data observations and data features on the same 2D projection. From the center point of the panel (the intersection among all connected lines), the horizontal axis represents the primary principal component while the vertical axis represents the second principal component. Each observation in the data set is represented by a small blue circle that has a relative position to the principal components. Each vector is color encoded [43]. Display (b) shows nine feature vectors of 2D projections, including convex, sparse, clumpy, striated, skewed, stringy, monotonic, skinny, and outlying [62]. Example plots are chosen based on their values on each of the statistical measures to covey possible data patterns in the data. The position of each thumbnail is relative to principal components. Users can start their analysis process by picking up a variable from a list, from in the overview panel, or exemplary plots explained next.

To avoid overwhelming viewers with a large number of generated plots, exemplary plots are automatically selected which are prominent on certain visual features, such as skewness, variances, outliers [14] (for univariate) and correlations [51], clusters [4], Stringy, Striated [62] (for bivariate) among other high dimensional features [16, 20]. The visual features and abstraction levels are also heuristically associated in these four exemplary plots. The predefined associations are color-coded in the catalog in FIG. 4.

Now referring to FIG. 7, univariate exemplar plots for the Baseball data in accordance with one embodiment of the present invention are shown. The declarative language is shown on the left, and the visual representations are shown on the right. In particular for univariate, HMaViz heuristically defines four levels of visual abstraction vs. four data distribution features in the initial view including low-outlier, medium-multimodality, fair-variance, and high-skewness. The first abstract visual type (as depicted in exemplar plot (a)) is the ticks plot of variable SlugRate which has the highest outlier score (on the top right corner of the plot). The ticks plot is at the lowest abstraction level because every single data instance (including outliers) is plotted and selected (to see its detail). The capability is desirable in many application domains as outlier detection is one of the critical tasks for visual analysis [7].

The bar chart is used as a recommended visual abstraction for the second level (as illustrated in exemplar plot (b)) because it highlights the skewness of data distribution. The highest skewness value is calculated from values in a given dimension. In contrast to regular binning, the data-dependent binning starts out where the actual data located and create a smooth representation of the distribution density [28]. An area chart is used for this purpose (in 1D) as the fair visual abstract type (in exemplar plot (c)). The Box plot is recommended for the highest abstraction level type of visual encoding in exemplar plot (d) as it is a standardized way of displaying the data distribution each variable based on the five-number summary: minimum, first quartile, median, third quartile, and maximum. It is desirable to keep this Miller magic number consistently across the highest level abstractions (for multivariate analysis) in the visual framework. For example, the 2D contours (the most abstracted bivariate representation in HMaViz) are separated into five different layers.

Figure 8:
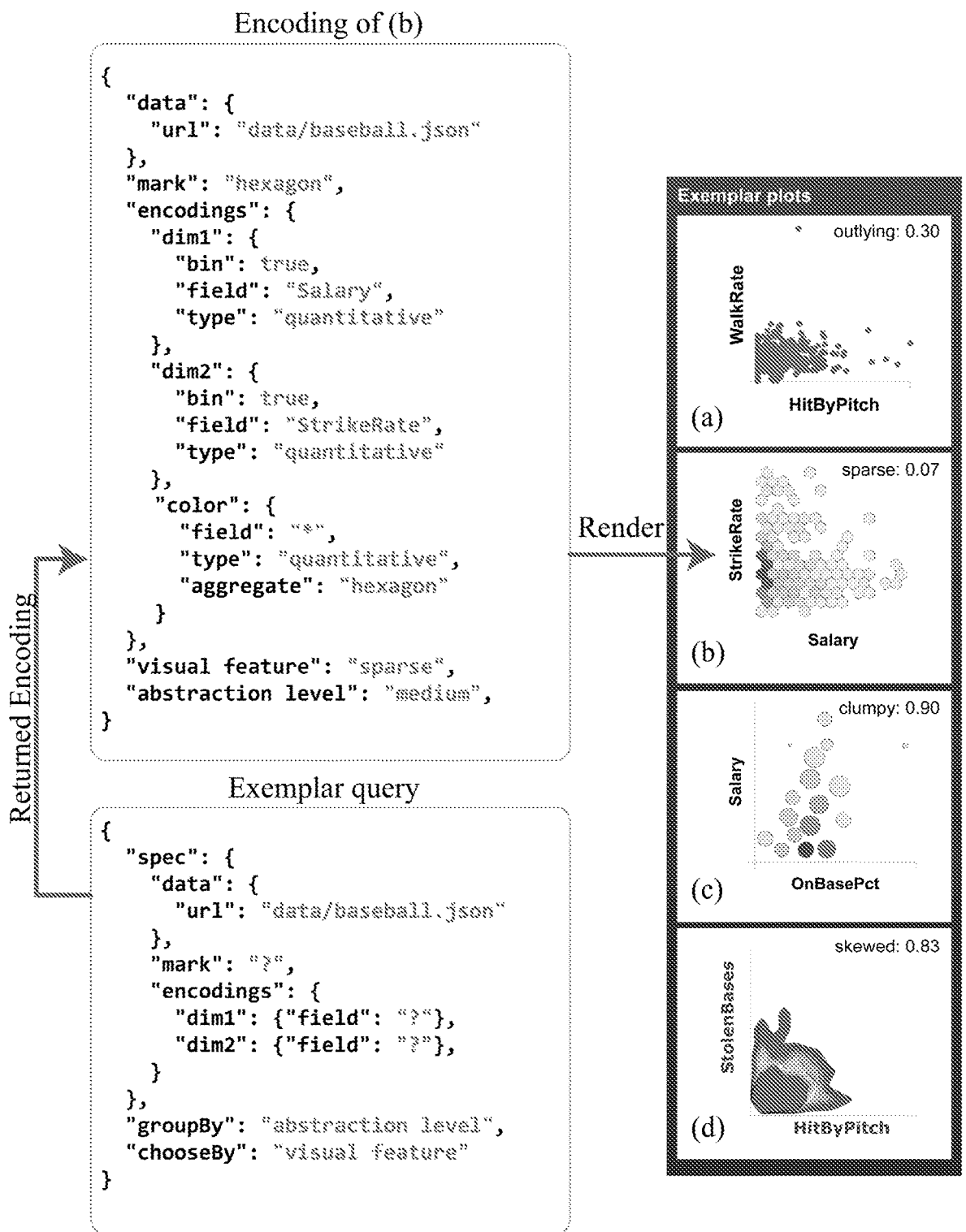
FIG. 8 depicts declarative language and bivariate exemplar plots for the Baseball data in accordance with one embodiment of the present invention.

Referring now to FIG. 8, bivariate exemplar plots for the Baseball data in accordance with one embodiment of the present invention are shown. The declarative language shown on the left, and the visual representations are shown on the right;

The focus view panel displays the close-up view of the selected variables, visual encodings, abstraction level. As depicted in FIGS. 2A-2B, all statistical feature scores are displayed together with other details of the focus scatterplot.

To support ordering, filtering, and navigation high dimensional space, focus and context explorations are provided. In particular, thumbnails and glyphs [19] are used to provide high-level overview such as Skeleton-Based Scagnostics [38] for multivariate analysis and support focus and context navigation (highlighting the subspace that the user is looking at). The guided navigation view provides a high-level overview of all variables and allows users to explore all possible combinations of variables. The view is color-coded by the selected statistical driven features and order the plots so that users can quickly focus on the more important ones [1].

Figure 9:
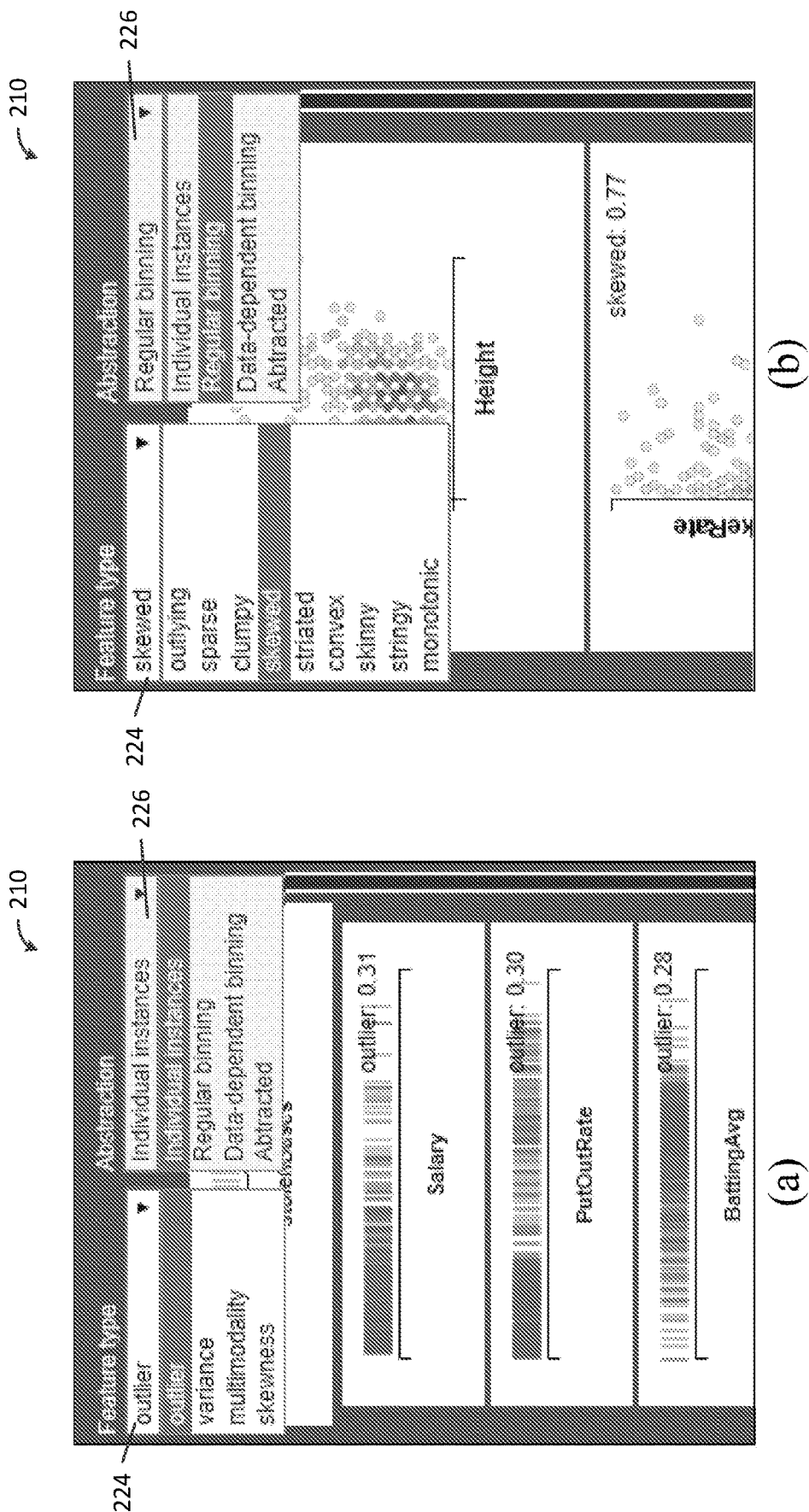
FIG. 9 depicts visual feature selection and abstraction representations in the navigation panel in accordance with one embodiment of the present invention.

Now referring to FIG. 9, visual feature selection 224 and abstraction representations 226 are shown in the guided navigation panel 210 in accordance with one embodiment of the present invention. Within the guided navigation panel 210, users can change abstraction levels 226 as well as the visual pattern of interest 224. The guided navigation 210 (as well as the focus view) will be updated as users select different abstraction levels. Moreover, guided navigation will be reorganized as users select a different feature of interest. Panel (a) shows the available selections for 1D (see FIG. 4). Panel (b) shows the available selections for 2D and 3D (see FIG. 4).

Figure 10:
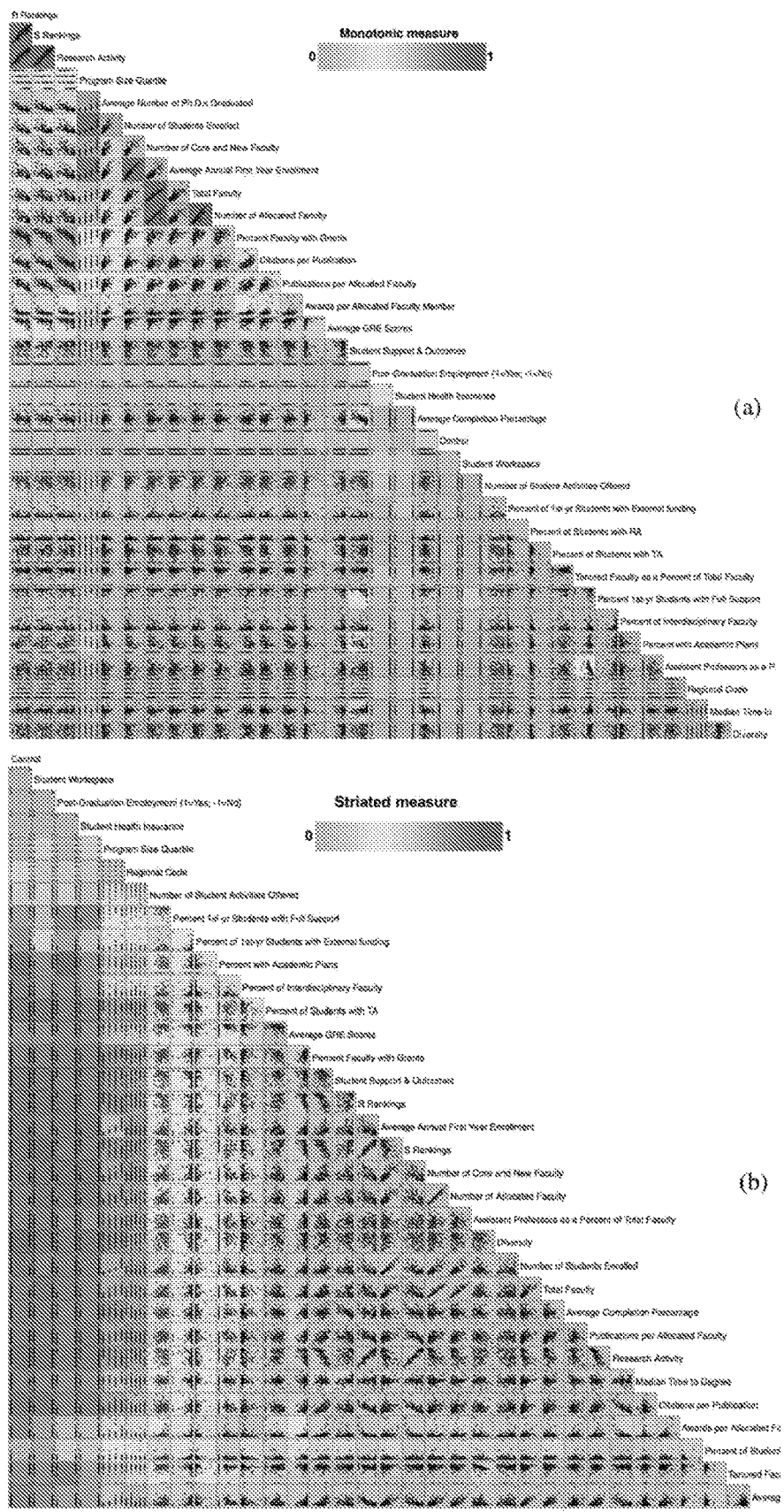
FIG. 10 depicts a navigation panel for 33 variables ordered and colored by in accordance with one embodiment of the present invention.

Referring now to FIG. 10, examples of the 2D guided navigation for a data set of 33 variables in accordance with one embodiment of the present invention are shown. The guided scatterplot matrices are colored and organized by the selected visual features (Monotonicity and Striated respectively). Panel (a) depicts the variables ordered and colored by pairwise correlation. Panel (b) depicts the variables ordered and colored by striated patterns.

Voyager [64] and Draco [39] provide interactive navigation of a gallery of generated visualizations. These systems support faceting into trellis plots, layering, and arbitrary concatenation. Our HMaViz incorporates faceted views into the expanded panel and also supports more flexible and complicated layouts such us biplots, scatterplot matrices (as depicted in FIG. 10), and parallel coordinates to provide visual guidance via data characterization methods [21, 63].

From one dimensional to two-dimensional visualization. FIG. 11(a) shows the recommended scatterplot when the current visualization is a tick plot (since every instance can be brushed in both plots). If the focused plot is a bar chart then the suggested chart is the 2D hexagon bins as depicted in FIG. 11(b) (since they are both in the medium abstraction level). When the area plot is used, the recommended representation is the 2D leader plots as depicted FIG. 11(c). The leaders (balls) are representative data points which groups other data points in their predefined radius neighborhood [28]. The intensity of the balls represents the density of their cluster while the variance of their members defines the ball sized. And finally, contour plot is used as the next level recommendation of box plot as shown in FIG. 11(d) where the second dimension is selected based on the current selected visual score.

Figure 11:
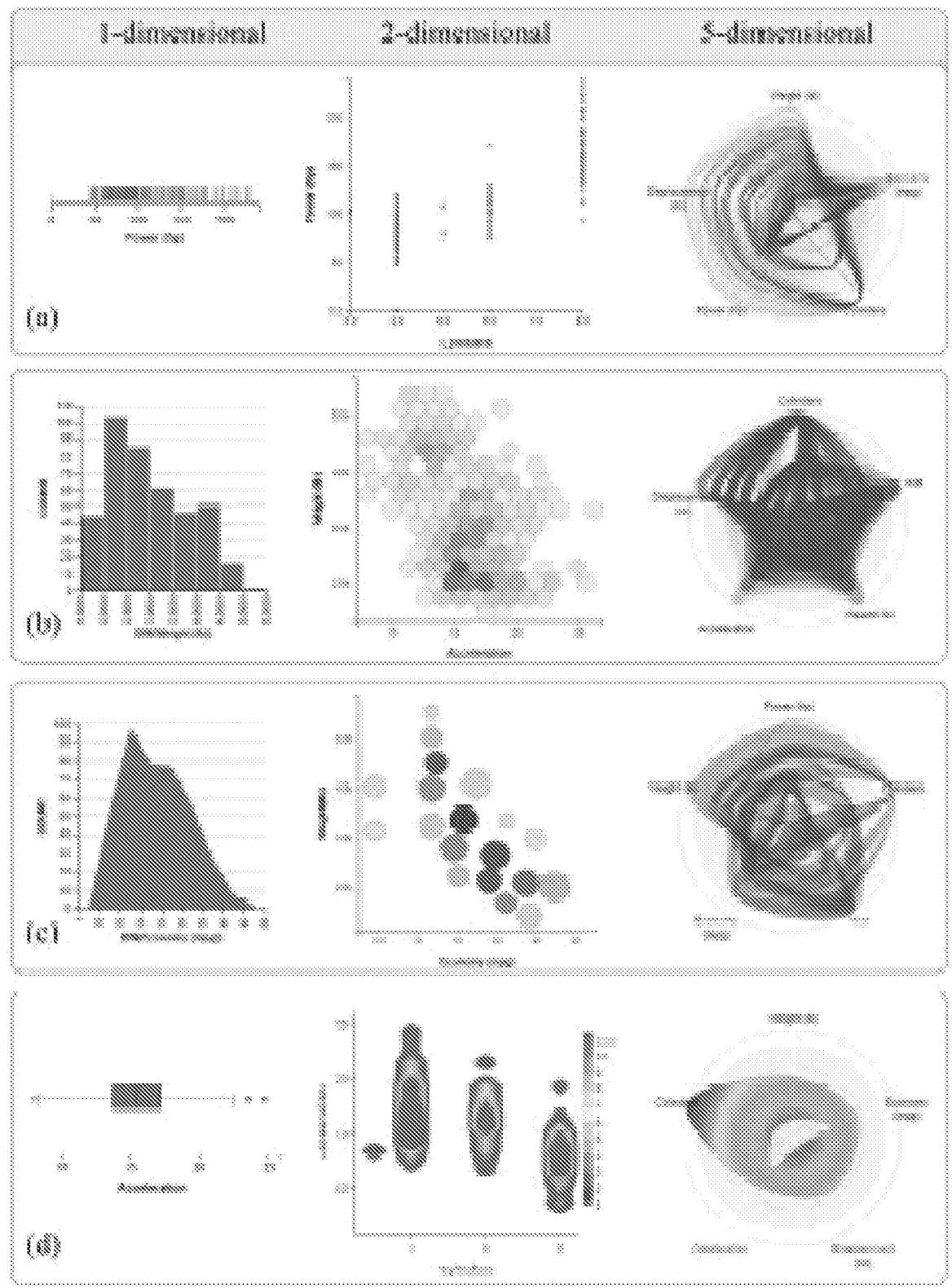
FIG. 11 depicts a visualization recommendation from 1D to 2D and from 2D to nD in accordance with one embodiment of the present invention.

From two-dimensional graph to higher-dimensional graph. The rightmost column in FIG. 11 show examples of equivalent higher-dimensional representation for the ones on the left. Notice that in the right panel of FIG. 11(c), the closed bands (groups) has different widths as the variance in these groups varies on each dimension. FIG. 11(d) is new radar bands which try to summary the multivariate data across many dimensions. In particular, the inner and outer border of the bands are the first and third quartiles of each dimension the middle black curve travel through the medians of the dimensions.

Typical 3D plots are well known in the InfoVis community to have perceptual issues, which can be alleviated through rotation, panning, and zooming. These 3D plots are still included in the visual framework since there are application domains in which data is naturally presented in 3D space.

When HMaViz has no prior information on user's behavior, the system will suggest charts with the following rules: (1) Keep the original dimension(s) and add dimension and (2) The additional dimension will be ranked based on the selected (or interested) visual features. When the system has the histories of user's interest on the four projected dimensions, past knowledge on visual layouts will be applied for the suggestion so that they do not have to navigate to the expected view from the beginning, especially when the analysis task is extensively repeated (requirements CR1).

The HMaViz is implemented in javascript, Plotly, D3.js [5], and angularJS. The web interface allows users access from everywhere with the internet connection. Therefore many visual analytics tasks of water resource and soil scientist can be done on-the-field right on their smart devices (that can help to resolve the issues of CR3 and CR4).

The visual framework also recommends the right abstraction level depending on number of plots in the navigation panel and expanded view (as well as the number of data instances). A multithreading mechanism is adopted to increase the responsive of the visual interface. For example, when users increase the number of dimensions in their analysis, HMaViz invokes another web worker to perform statistical feature calculation (for the new type of analysis with an additional dimension) so that the main interface is still responsive to handle a new user request.

Figure 12:
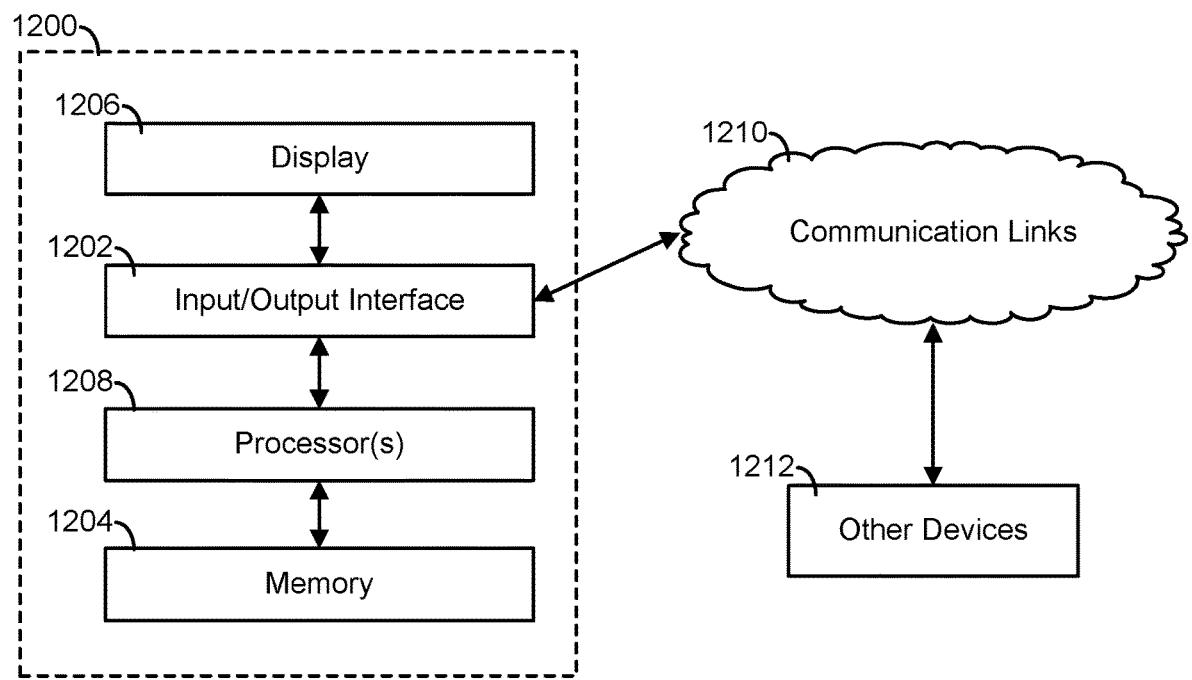
FIG. 12 depicts a block diagram of an apparatus for providing a visual representation of a data set in accordance with one embodiment of the present invention.

Now referring to FIG. 12, a block diagram of an apparatus 1200 for providing a visual representation of a data set is shown. The apparatus 1200 includes an input/output interface 1202, a memory 1204, a display 1206 communicably coupled to the input/output interface 1202, and one or more processors 1208 communicably coupled to the input/output interface 1202 and the memory 1204. Note that the apparatus 1200 may include other components not specifically described herein. The memory 1204 can be local, remote or distributed. Likewise, the one or more processors 1208 can be local, remote or distributed. The input/output interface 1202 can be any mechanism for facilitating the input and/or output of information (e.g., web-based interface, touch-screen, keyboard, mouse, display, printer, etc.) Moreover, the input/output interface 1202 can be a remote device communicably coupled to the one or more processors 1208 via one or more communication links 1210 (e.g., network(s), cable(s), wireless, satellite, etc.). The one or more communication links 1210 can communicably couple the apparatus 1200 to other devices 1212 (e.g., databases, remote devices, etc.).

The one or more processors 1208 receive a data set having two or more variables, receive a selection of at least one of the two or more variables, an abstraction level and a visual feature, automatically generate and display a set of visual representations of the data set on the display 1206 based on the selected variable(s), selected abstraction level and the selected visual feature, wherein each selected variable is represented as a dimension and the set of visual representations comprise at least a guided navigation view, a focus view and an expanded view, receive a change in the selected variables, selected abstraction level, the selected visual feature, or a selection from the guided navigation view, the focus view or the expanded view, determine a visual representation recommendation based on the selected variable(s), selected abstraction level and the selected visual feature, the change in the selected variables, selected abstraction level, the selected visual feature, or the selection from the guided navigation view, the focus view or the expanded view, and automatically update and display the set of visual representations of the data set on the display 1206 based the visual representation recommendation, and the change in the selected variables, selected abstraction level, the selected visual feature, or the selection from the guided navigation view, the focus view or the expanded view.

In one aspect, the selected abstraction level comprises a default abstraction level; or the selected visual feature comprises a default visual feature or a stored visual feature. In another aspect, the selected abstraction level comprises individual instances, regular binning, data-dependent binning or abstracted; and the selected visual feature comprises outlier, variance, multimodality, skewness, skinny, striated, stringy, monotonic, convex, clumpy, parallelism, angles of crossing, correlation, line crossings, pixel-based entropy, convergence or over-plotting. In another aspect, the set of visual representations further comprise, an overview or an exemplar view. In another aspect, the one or more processors store the visual representation recommendation in a user profile. In another aspect, the visual abstraction level comprises individual data points, regular binning, data-dependent binning or abstracted/grouped data; and the visual feature comprising outlying, multi-moded, skewness or principal component(s). In another aspect, the one or more processors repeat receiving the change, determining the visual representation recommendation, and automatically updating and displaying the set of visual representations of the data set. In another aspect, the set of visual representations are defined by a catalog of visualizations. In another aspect, the visual representation recommendation narrows down a smaller set of visualizations that suit a user's analysis. In another aspect, the one or more processors: generate a raw data set using one or more sensors; pre-process the raw data; calculate one or more statistics based on the pre-processed data; interpolate the statistics and/or the pre-processed data; and create the data set based on the interpolated data, the statistics and/or the pre-processed data. In another aspect, the apparatus is portable. In another aspect, the data set comprises a soil data set. In another aspect, the set of visual representations of the data set comprise one or more of a correlation graph, a contour map, a heatmap, a box-plot or a goodness-of-fit graph.

Figure 13:
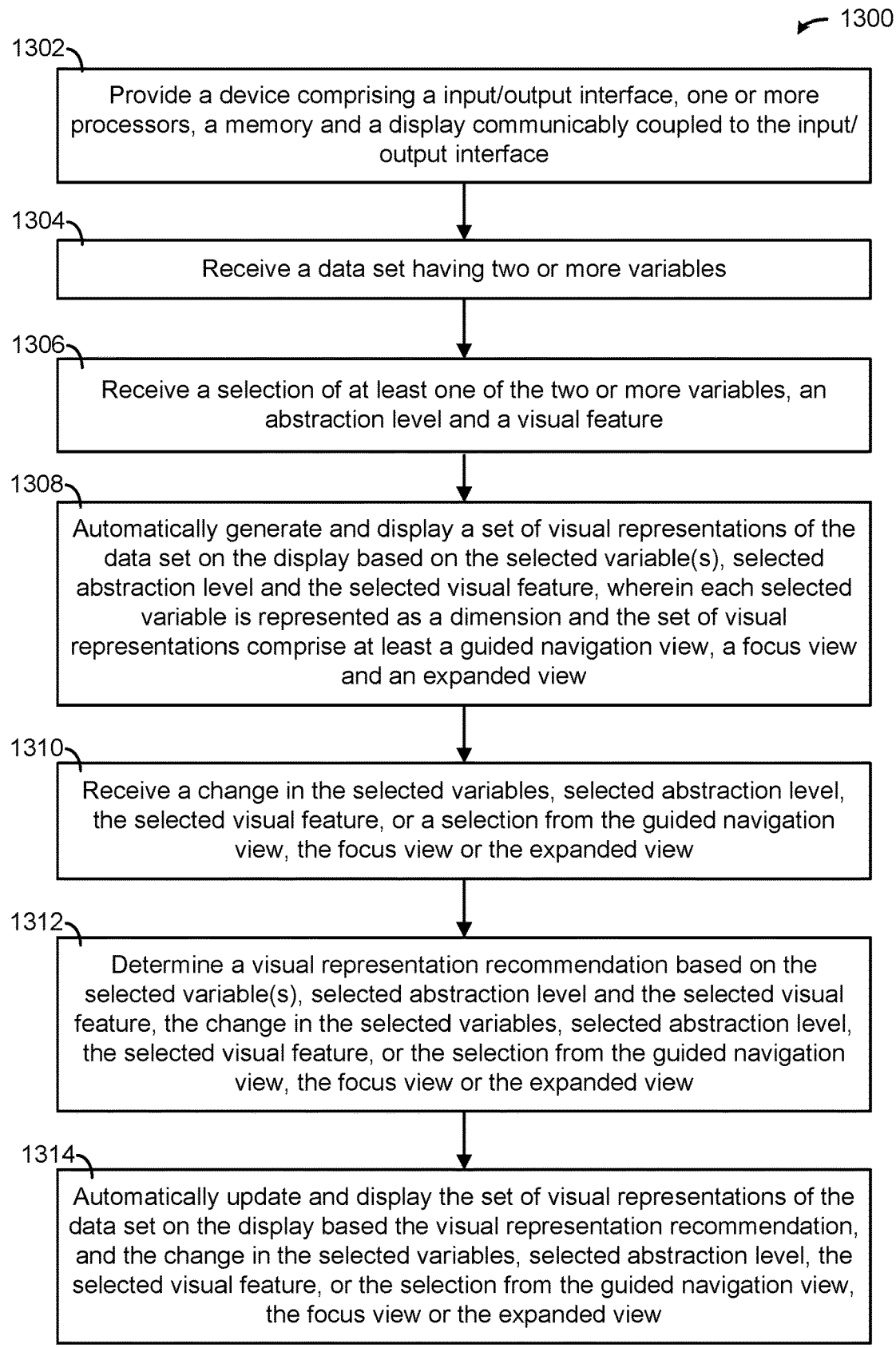
FIG. 13 depicts a flowchart of a computerized method for providing a visual representation of a data set in accordance with one embodiment of the present invention.

Referring now to FIG. 13, a flowchart depicting a computerized method 1300 for providing a visual representation of a data set is shown. A device having an input/output interface, one or more processors, a memory and a display communicably coupled to the input/output interface is provided in block 1302. A data set having two or more variables is received in block 1304. A selection of at least one of the two or more variables, an abstraction level and a visual feature is received in block 1306. A set of visual representations of the data set are automatically generated and displayed on the display based on the selected variable(s), selected abstraction level and the selected visual feature in block 1308. Each selected variable is represented as a dimension and the set of visual representations comprise at least a guided navigation view, a focus view and an expanded view. A change in the selected variables, selected abstraction level, the selected visual feature, or a selection from the guided navigation view, the focus view or the expanded view is received in block 1310. A visual representation recommendation is determined in block 1312 based on the selected variable(s), selected abstraction level and the selected visual feature, the change in the selected variables, selected abstraction level, the selected visual feature, or the selection from the guided navigation view, the focus view or the expanded view. The set of visual representations of the data set are automatically updated and displayed on the display in block 1314 based the visual representation recommendation, and the change in the selected variables, selected abstraction level, the selected visual feature, or the selection from the guided navigation view, the focus view or the expanded view.

In one aspect, the selected abstraction level comprises a default abstraction level; or the selected visual feature comprises a default visual feature or a stored visual feature. In another aspect, the selected abstraction level comprises individual instances, regular binning, data-dependent binning or abstracted; and the selected visual feature comprises outlier, variance, multimodality, skewness, skinny, striated, stringy, monotonic, convex, clumpy, parallelism, angles of crossing, correlation, line crossings, pixel-based entropy, convergence or over-plotting. In another aspect, the set of visual representations further comprise, an overview or an exemplar view. In another aspect, the method further comprises storing the visual representation recommendation in a user profile. In another aspect, the visual abstraction level comprises individual data points, regular binning, data-dependent binning or abstracted/grouped data; and the visual feature comprising outlying, multi-moded, skewness or principal component(s). In another aspect, the method further comprises repeating the receiving the change, determining the visual representation recommendation, and automatically updating and displaying the set of visual representations of the data set. In another aspect, the set of visual representations are defined by a catalog of visualizations. In another aspect, the visual representation recommendation narrows down a smaller set of visualizations that suit a user's analysis. In another aspect, the method further comprises: generating a raw data set using one or more sensors; pre-processing the raw data; calculating one or more statistics based on the pre-processed data; interpolating the statistics and/or the pre-processed data; and creating the data set based on the interpolated data, the statistics and/or the pre-processed data. In another aspect, the device is portable. In another aspect, the data set comprises a soil data set. In another aspect, the set of visual representations of the data set comprise one or more of a correlation graph, a contour map, a heatmap, a box-plot or a goodness-of-fit graph.

The soil is an essential element of life. It is where people grow plants for food, fibers, and other materials. It also helps to filter water and recycles wastes. Therefore, understanding soil physical/chemical characteristics and structural aggregation are of vital importance. This embodiment of the visual framework provides a visualization solution to the rapidly gaining favor approach to soil horizon analysis using Portable X-ray Fluorescence (pXRF) devices. This visualization, called SOA_HMaViz, aims to provide soil scientists with rapid valuable insights into soil properties both visually perceptible with graphs and imperceptible quantification features with statistical calculations from the data collected from pXRF equipment. SOA_HMaViz was developed with analysis tasks solicited from the soil scientists and validated by applying to real soil profiles collected in an Experimental Rangeland in Lubbock, TX, USA. This visual solution together with the quick scanning results from pXRF devices offers a timely means of quantifying elemental concentrations in the soil horizons in large scale at a reduced cost.

Agriculture is tasked with feeding a large and increasing population with limited natural resources. In addition, soil health is gradually decreased due to unsustainable agricultural practices and environmental management [96], which leaves pressures on policy maker on better solutions for managing and controlling the properties related to soil health. Because accurate soil health assessments require many different types of measurements, researchers have struggled to establish an effective unified method for quantifying soil health [101]. Sensor-based approaches may provide a cost-effective, site-specific solution for soil health monitoring and management. Recently, using proximal sensors such as portable X-ray fluorescence spectrometry (pXRF) to analyze soil horizons is gaining favor [94, 83] with the ability to provide faster scanning results (in 60 to 90 seconds), it offers a rapid means of quantifying elemental concentrations in the soil [86, 90]. This embodiment focuses on analyzing the collected data from proximal sensors.

While the scanning time reduced significantly, the analyzing time is still a time-consuming process which may take days or weeks and involve many people with different expertise for data collection, chemical measurements, visual representation, and data analysis. Currently, soil scientists use traditional software to analyze the scanned results such as Microsoft Excel or some complicated packages such as ArcGIS and MatLab or even programming languages such as R or Python to create custom visualizations for the analysis part. Moreover, current soil data analytics approaches are limited to very few dimensions to be considered at the same time and therefore the analysis outcomes heavily rely on the skills and experiences of the soil experts. In this embodiment, a visual prototype, called SOA_HMaViz, analyzes the multidimensional data from pXRF equipment on-the-fly. Hence, the main contributions are as follows:

An approach for analyzing soil chemical data scanned by pXRF devices, which is implemented as a web application and is portable, so soil scientists can upload soil data to analyze on-field.

This embodiment incorporates statistical features for detecting distribution and correlations of chemical elements identified in the soil profile [80]. These features and visualizations provide scientists a lens into both visually perceptible features (with graphs) and imperceptible features (with statistical calculations) of the soil profiles.

The solution is applied to three soil profiles collected in an Experimental Rangeland in Lubbock, TX, USA and an informal user study was conducted with the soil scientists.

Overall, the tool has three overview visualizations: (a) chemical elements and how they are correlated to each other; (b) concentration of elements across the cross 2D section's cells; and (c) the concentration of elements across the cross section's horizontal levels. The interaction capabilities are restricted to low-level routine methods [68]. The overview visualizations might be useful to highlight outliers, and visual features [70, 99] in the data distribution which is an important step in data-intensive science [79].

Visible and near-infrared (VisNIR) diffuse reflectance spectroscopy (DRS) is a promising hyperspectral scanning technology that has become popular for rapidly quantifying and identifying multiple soil parameters simultaneously [92]. By comparison, VisNIR spectroscopy utilizes reflectance patterns from visible and near-infrared light emitted from a contact probe or mug lamp to make determinations of soil properties. This hyperspectral technique has achieved wider acceptance in soil science, owing to its cost-effectiveness and advantages over other analytical spectroscopic and wet chemistry methods. VisNIR spectroscopy perfectly complements many of the "gaps" not easily read by PXRF [102]. Emerging proximal sensor technologies such as diffused reflectance spectroscopy (DRS) and portable XRF (PXRF) can efficiently quantify soil salinity, total C/total N, and other soil properties [106, 77]. Coupled with georeferencing, the combined use of DRS and PXRF enables us to predict multiple soil properties in a single day on-site with non-destructive scans [100, 75]. This embodiment focuses on proximal sensor technologies, particularly the on-the-field collected data via portable XRF devices [87].

Figure 14B:
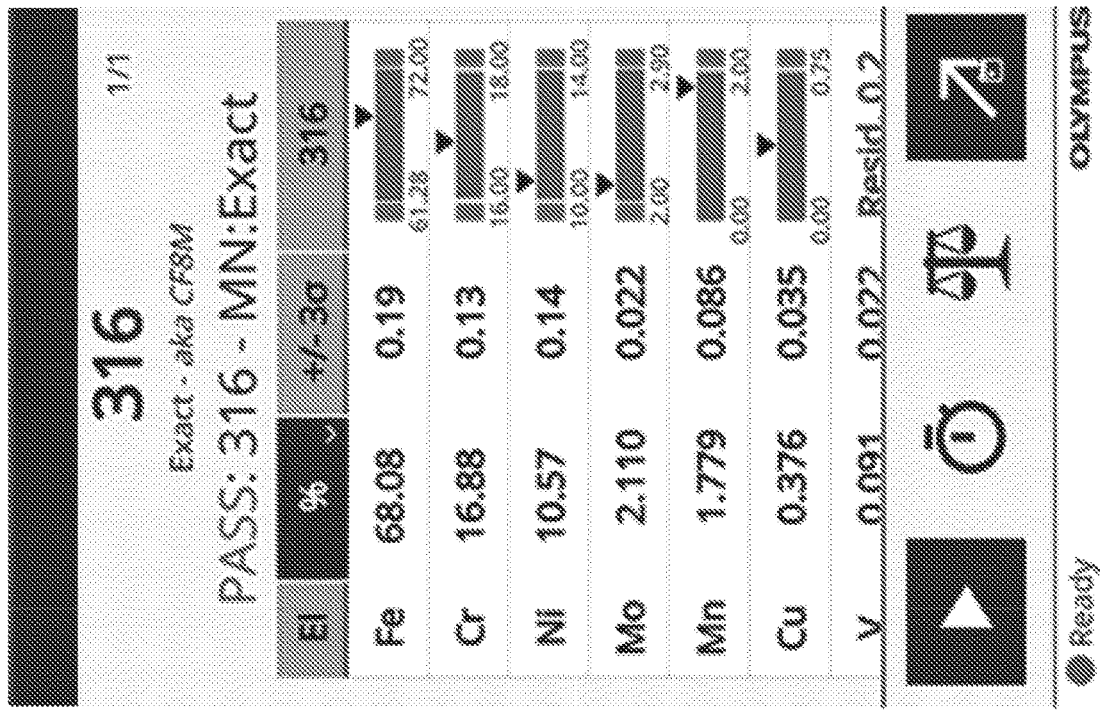
FIGS. 14A-14B depicts a Vanta Handheld XRF series built-in interface in accordance with one embodiment of the present invention.
Figure 14A:
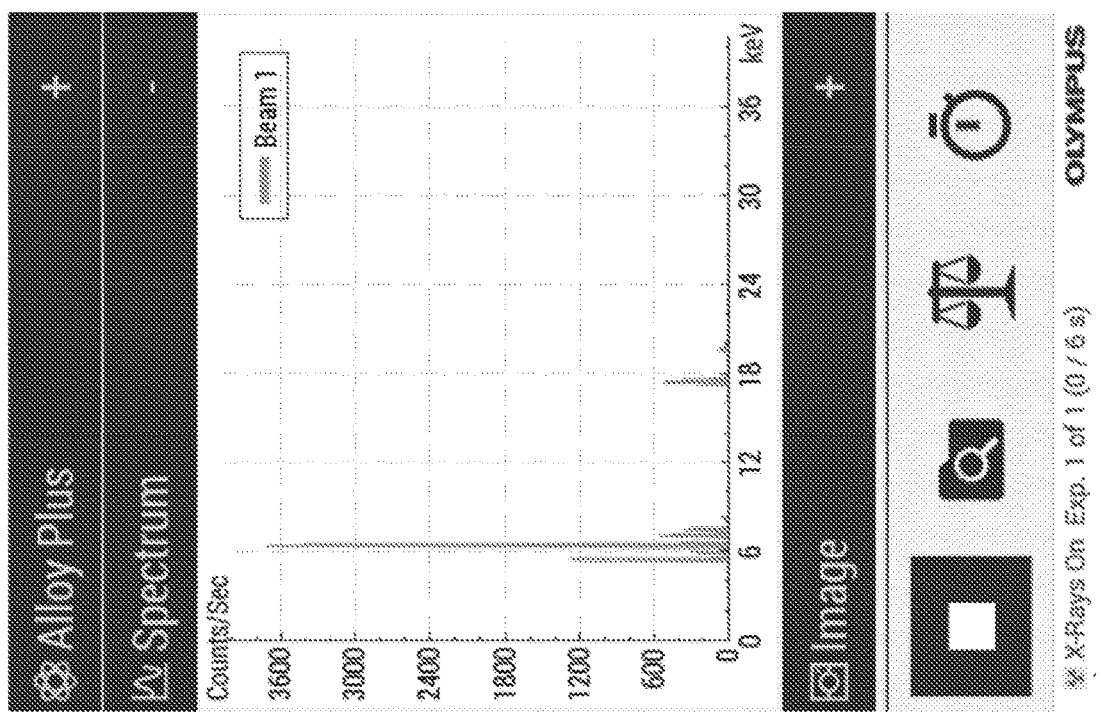

In this embodiment, surveying all visualizations solutions for analyzing soil horizon data coming from pXRF devices was not attempted, but general tools that soil scientists often use for their analysis were provided. The pXRF devices, such as Vanta Handheld XRF Series (Olympus Corporation) and the Handheld XRF analyzers (Hitachi High-Tech Analytical Science), provide some basic statistics (simple listing) incorporated into their device screens. However, these are mostly tabular format data displays or basic charts and usually does not scale well with the data sizes. FIGS. 14A-14B shows two typical screens from Vanta Handeld XRF Series built-in interface adapted from Vanta Family X-Ray Fluorescence Analyzer User's Manual [69]. In many cases, soil scientists need to create their own visualizations to suit their analysis purposes which highlight the trends and patterns in a large amount of collected data. In these cases, the solutions could be generally categorized into three main approaches as using a traditional method, advanced software, or custom programming code.

The conventional approach to analyzing pXRF soil pedon scanning results is using Microsoft Excel [106]. Some advanced software packages such as Global Mapper (Blue Marble Geographics, Hallowell, ME), ArcGIS (ESRI, The Redlands, CA), NCSS 8 (NCSS, Kaysville, UT) [90, 83], MDI Jade v9.1.1 [77], GeoChem, and SAGA GIS [75] require a reasonable training time before being able to use them. In many cases, soil scientists even need to use complicated programming languages/packages like MatLab, R, and Python to analyze their data [104]. These visual representations customized for individual cases based on the data collection settings and tasks are time-consuming to be generated and usually required experiences and skills in using the software packages and/or programming languages. For the same task, the analysis process can be repetitive over the years. As the availability of pXRF devices, soil pedon data are easier and faster to collect. Therefore, it is desirable for a unified framework for analyzing this type of data with consistency, high performance, and reduced cost. Our SOA_HMaViz prototype is designed to fill in this gap.

Figure 15:
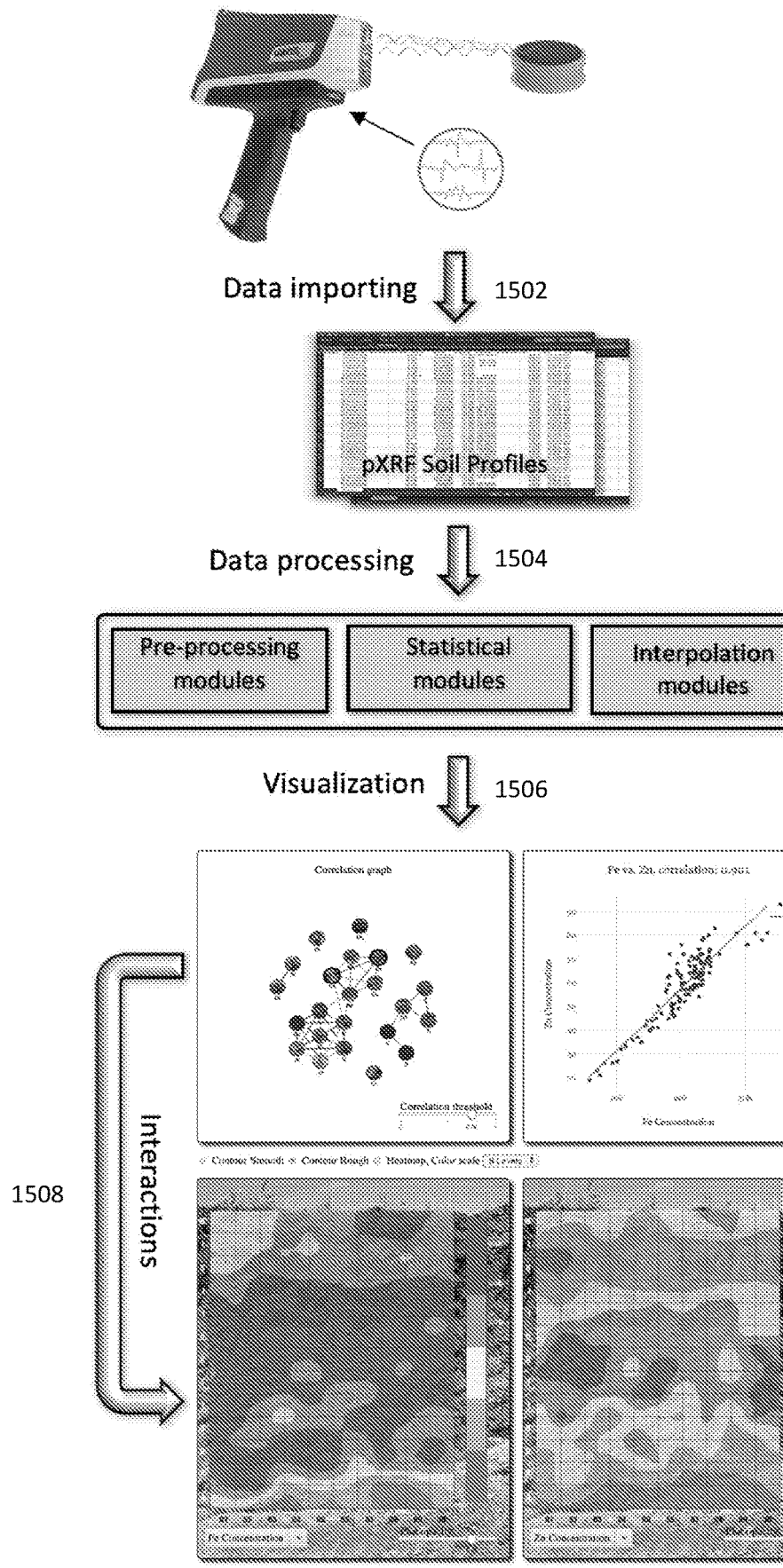
FIG. 15 depicts major stages in SOA_HMaViz roadmap: data importing, processing, data visualizing, and interactions in accordance with one embodiment of the present invention.

This embodiment aims to provide visual representations for the collected data. The visualization can be generated on-the-fly so that obvious mistakes in data collection can be corrected while the soil scientists are still on the field (which otherwise very expensive or irreversible). FIG. 15 depicts the major phases of the system: data importing 1502, data processing 1504, visualization 1506, and interactions 1508.

Data processing 1504: The data processing stage consists of several modules for data cleaning, adding of some important soil compounds, and statistical calculations for the correlations of the concentrations of the detected chemical elements.

Data visualizations 1506: There are several interconnected graphs to show the spatial chemical element distributions in the pedon, and the statistical correlations among these elements are also displayed.

Interactions 1508: Interactions allow selecting individual soil profile to analyze, picking different chemical elements (or their compounds) to compare their correlations and/or changing display properties such as contour types, color ranges, and plot opacity.

While developing this visualization solution, the inventors worked closely with the soil scientists to implement the following analysis tasks [74,73] required while analyzing pXRF soil horizon scanning data:

T1: Provide an overview of all detected chemical elements and/or their compounds in the soil profile [85].

T2: Show and quantify the relationship between any two selected chemical elements and/or their compounds [82].

T3: Show and compare the spatial distributions of any two selected chemical elements and/or their compounds over the 2-D surface of the pedon.

T4: Quantify the distributions of any two selected chemical elements and/or their compounds over the pedon horizons.

T5: Show and quantify the difference between the traditional (6-horizons) soil profile approach and the newly exploring (10-cm-horizon across 13 horizons) approach to soil profiling.

T6: Detect and alert outlying data points [98] that might be caused by the mistakes happened during on-field soil scanning.

The soil scientists provided three soil profiles to evaluate and develop this visualization solution. The soil profiles were located on an Experimental Rangeland in Lubbock, TX, USA. The soil pits at each site were excavated to a depth of 1.2 m. Before the morphological process, strings were used to set up a grid across the entire pedon; each grid cell was 10 cm2. A column and row numbering system was applied, such that each grid cell had a unique identifier. Then, a Vanta Series M pXRF (Olympus Corporation) was used to scan the soil in each cell in situ.

After the data is imported from the pXRF devices, the data is then cleaned such as removing missing or lower than "LOD" (Limit of Detection) values. The remained pXRF elements detected in these soil horizons include 20 elements (Al, Ca, Cr, Cu, Fe, K, Mn, Nb, Ni, Pb, Rb, S, Si, Sr, Th, Ti, V, Y, Zn, and Zr). Besides the reported values on individual chemical elements, several important soil compounds such as Ruxton Weathering Index ($SiO_2/Al_2O_3$), Desilication Index ($SiO_2/(Al_2O_3+Fe_2O_3+TiO_2)$), and Stable Ratio (Ti/Zr) [94] are also calculated and added to the soil profile to aid the soil properties analysis.

The statistical modules help to calculate several statistics while analyzing soil profiles. Sample correlations [93] among the elements are used to show the relationships among them. Box-plot statistics [84] are calculated to show the distributions of element contamination in the thirteen measured horizons. R-squared scores [88] are used to quantify the goodness of fit between the exploring 10-cm-horizon across 13 levels approach versus the traditional 6-horizon-levels approach to soil profiling. The R-squared score was used in this case because it gives an estimate of the relationship between the movements of the two measurement approaches. The R-squared score of 1.0 represents a perfect match, and the R-squared score of 0.0 represents a not good match (simply fitting a curve to its mean value resulted in R-squared score of 0.0). Also, it provides sufficient generality [76] to cover reasonably the correlation between these two nonlinear curves of measured data.

The scanned pedon is divided into 13 (indexed from A to M) by 10 (indexed from 1-10) discrete cells of 10 cm by 10 cm each. Also, in some cases, outlying data in these discrete cells might be removed due to the mistake during scanning. On the visualizations, the soil scientists would like to have a smooth view of the chemical element contamination distributed on the pit. Therefore, the Krigging algorithm [97] was used to interpolate the data. This method is widely used in the spatial analysis which is governed by the Gaussian process regression to give better smoothness of the data distribution.

To realize the analysis tasks required by the soil scientists, coordinated multiple views [91] is adapted to show a different perspective of chemical elements: the correlation graphs, the scatter plots and linear regression line, the contour-map/heat-map, the box-plots, and the goodness of fit graphs. These views are linked.

Figure 16:
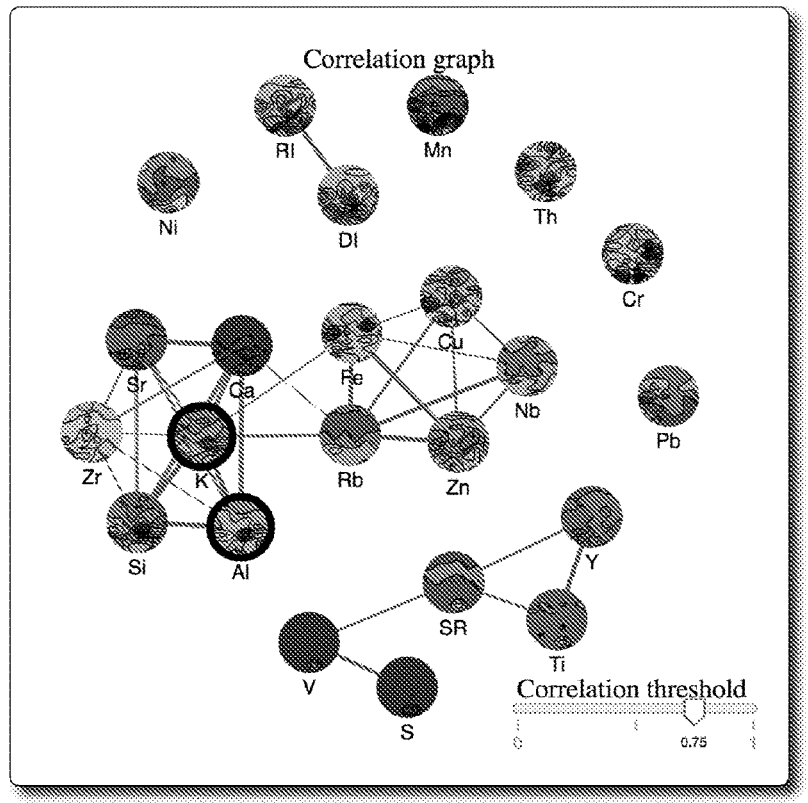
FIG. 16 depicts the correlation network of chemical elements and their compounds in a soil profile in which the vertex thumbnails show their chemical contamination maps in accordance with one embodiment of the present invention.

The correlation graphs: To give an overview of all detected chemical elements and their relationships (task T1 and task T2), SOA_HMaViz calculates the sample correlations among the elements and the compounds to generate a force-directed network graph [72], as shown in FIG. 16.

Each vertex represents a chemical element (or a chemical compound) and overlaid by its contamination contour to guide users during the exploration process. A link indicates the correlation between two nodes: the thicker the link, the higher the correlation. The color of the links encodes positive/negative correlations. Notice that the highly connected vertices represent similar contour patterns. Users can use the slider provided at the bottom right corner to refine the relationship network and focus on the strongly correlated chemical element. As the different soil profile is explored, the relationship network varies significantly across different profiles since they are collected from various locations and hence represent different soil classifications. Ruxton Weathering Index Desilication Index, and Stable Ratio are abbreviated as Ri, Di, and Ti in the network view. As shown on the top of FIG. 16, Ri and Di are positively correlated in this soil profile.

Figure 17:
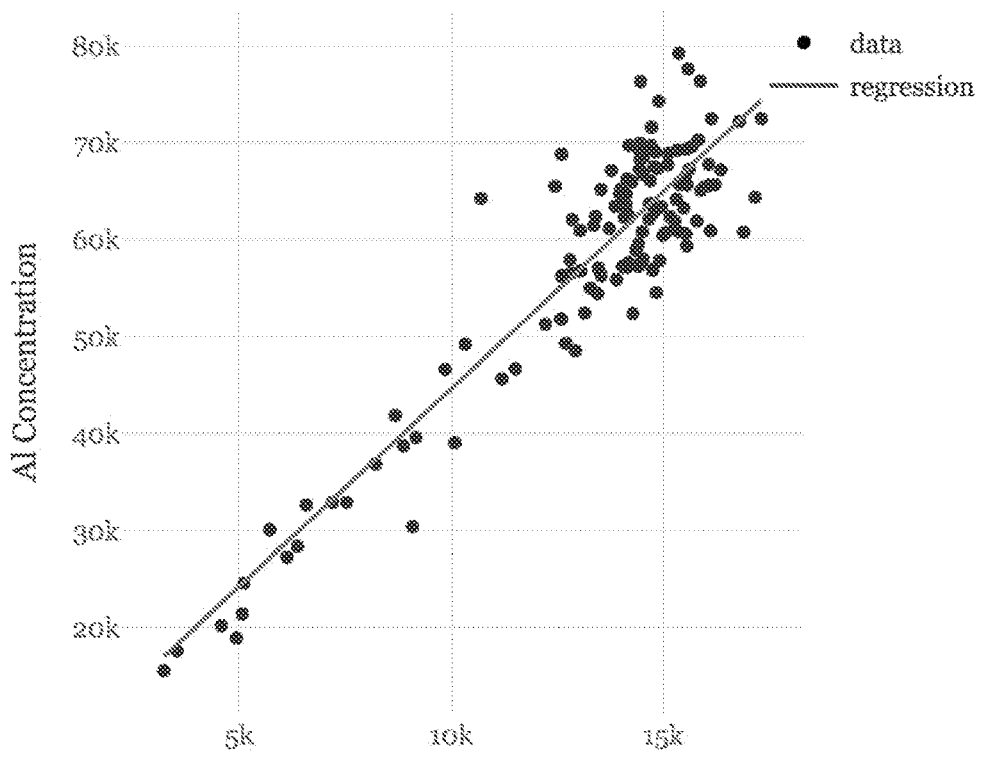
FIG. 17 depicts the scatterplot and the linear regression line of two selected chemical elements (K vs. Al) from the network in FIG. 16 in accordance with one embodiment of the present invention.
Figure 18A:
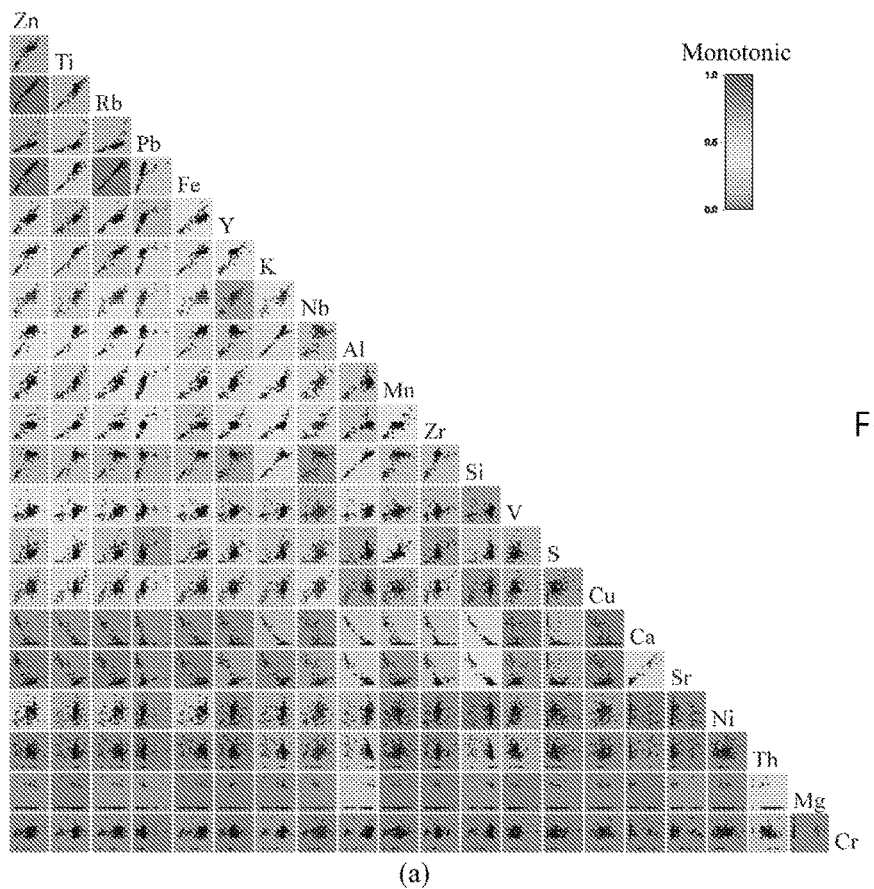
Figure 18A:
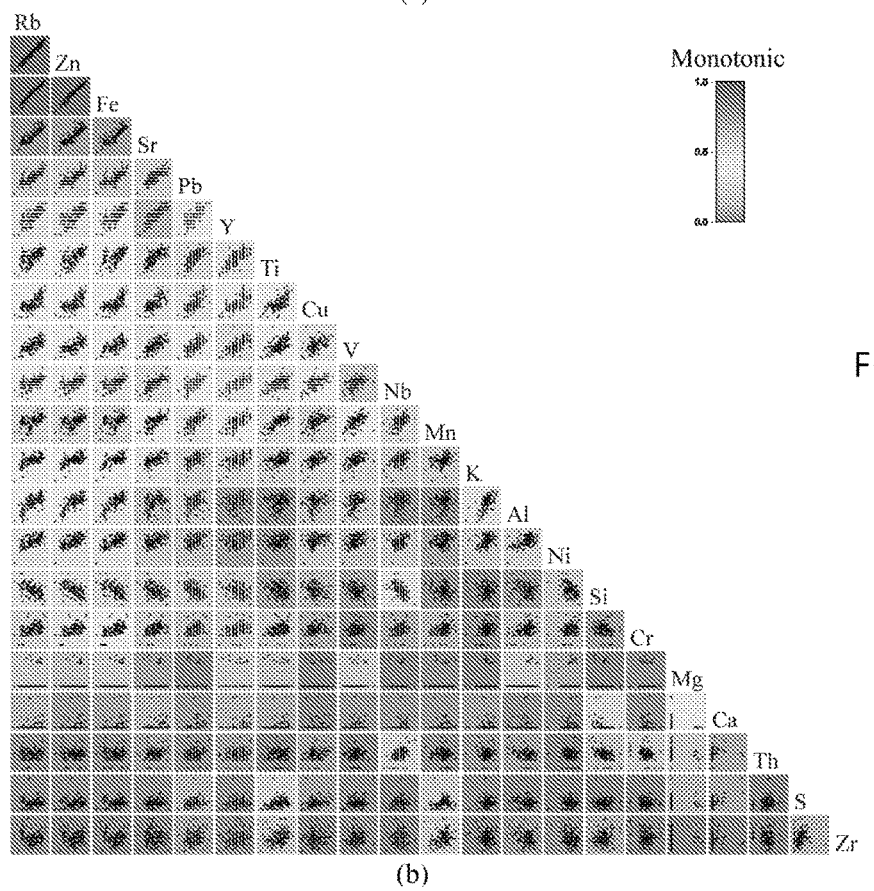

To verify the correlation of any two chemical elements or the compounds (visualization task T2), a scatterplot is generated on demand. As depicted in FIG. 17, each data point is an instance (or a pXRF shot) on the 2D soil profile grid. A linear regression line [89] is plotted as a reference for the estimated correlation. Furthermore, the Pearson correlation score can be displayed on top of the scatterplot to quantify and compare the relationship between any two selected chemical elements Now referring to FIGS. 18A-18B, the scatterplot matrices [78] of all pairwise correlation between 21 chemical elements in the two sample soil profile collected via the portable XRF device are shown. The scatterplots are color-coded by their Pearson correlation scores: red for high correlation, green for no association. The variables (chemical elements) have been ordered so that high correlated variables appear on the top of the matrix triangles.

Figure 19A:
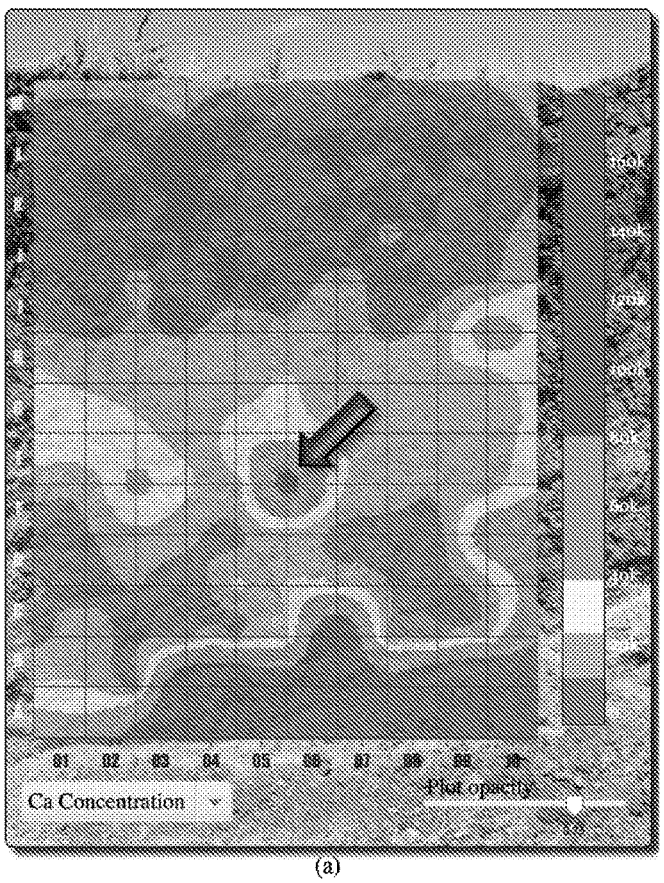
FIGS. 19A-19B depict the spatial distributions of the contamination of the detected chemical elements: (a) contour map (b) heatmap in accordance with one embodiment of the present invention.
Figure 19B:
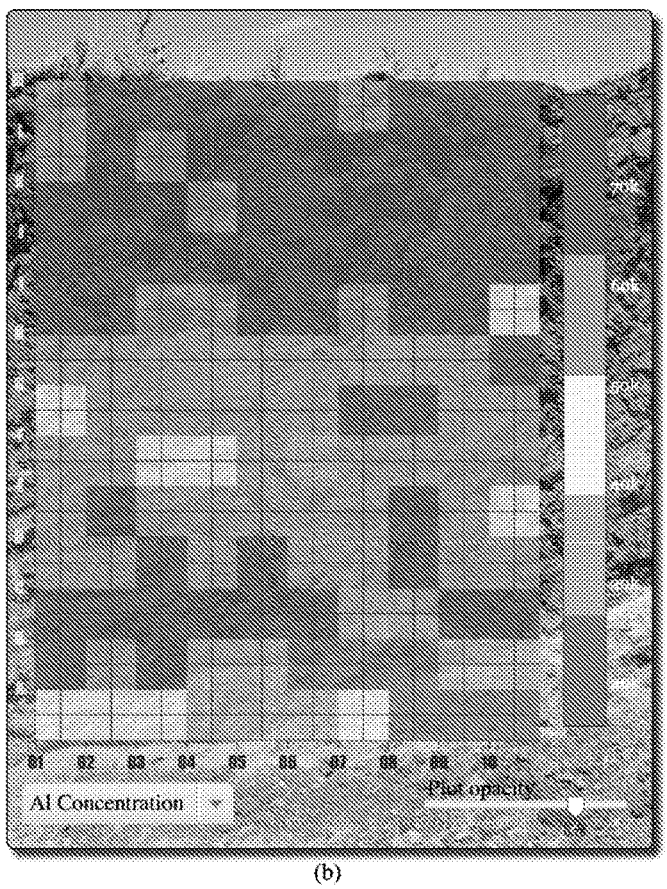

The contour maps/heatmaps: Relying on the string settings that were used to physically impose a grid across the profile during the on-field scanning, a contour-map or heat-map (can be made interchangeably on the user selection from the menu at the top of our visualization tool) is generated to mimics the actual spatial distributions of the element concentrations over the 2D surface of the pit (task T3). In case of the contour map as shown in FIG. 19A, the data is first interpolated using the Krigging algorithm to have smooth data over the pit. On the other hand, the discrete heat-map shows the discrete data scanned from the corresponding cells as in FIG. 19B. Notice that pXRF devices iteratively shot at the center of each cell.

Figure 20B:
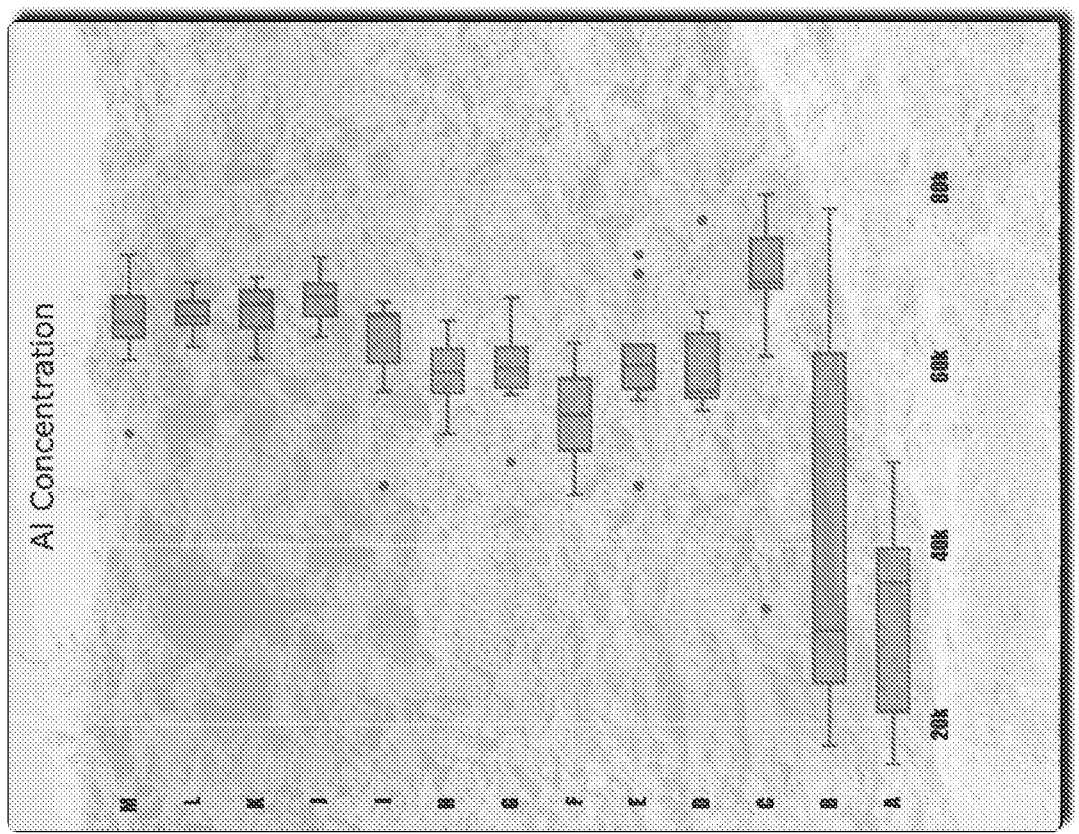
FIGS. 20A-20B depict the box-plots to show the distribution of the element contamination over the horizons of the pedon in which the Ca and Al concentrations vary significantly as shown in the last two rows in accordance with one embodiment of the present invention.
Figure 20A:
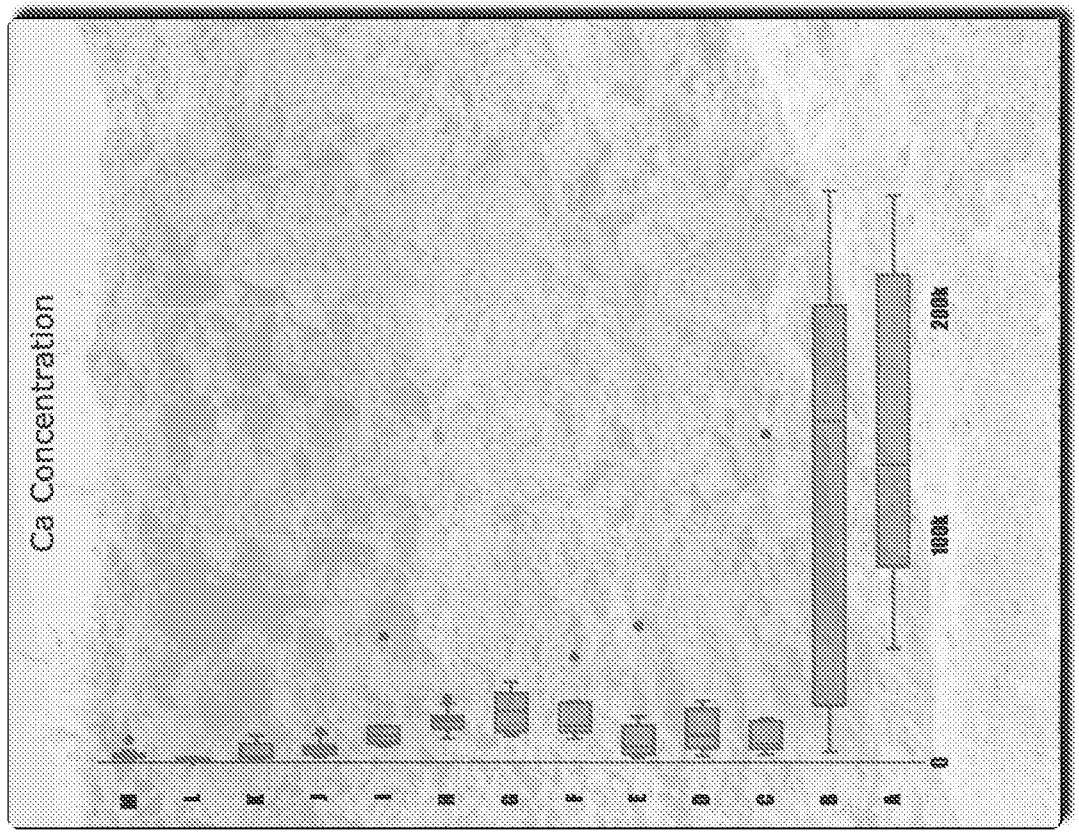

The box-plots: The box-plots are used to show distributions of the selected elements across the soil horizons of the pedon (visualization task T4) as shown in FIGS. 20A-20B. Box-plots are the standardized methodology the soil scientists use to graphically visualize the statistical distributions of the concentrations of the chemical elements across the soil horizons. In particular, boxplot displays the distribution of data based on a five number summary: minimum, first quartile, median, third quartile, and maximum [103]. It also shows the outliers which are not in the range from minimum to maximum (visualization task T6). Moreover, remove outlying data before applying other analysis techniques are recommended by many works in the soil research field [105, 81, 71]), as to improve the accuracy of the soil profile analysis. It can be quickly noticed that the chemical concentrations vary significantly the deeper you go.

Figure 21B:
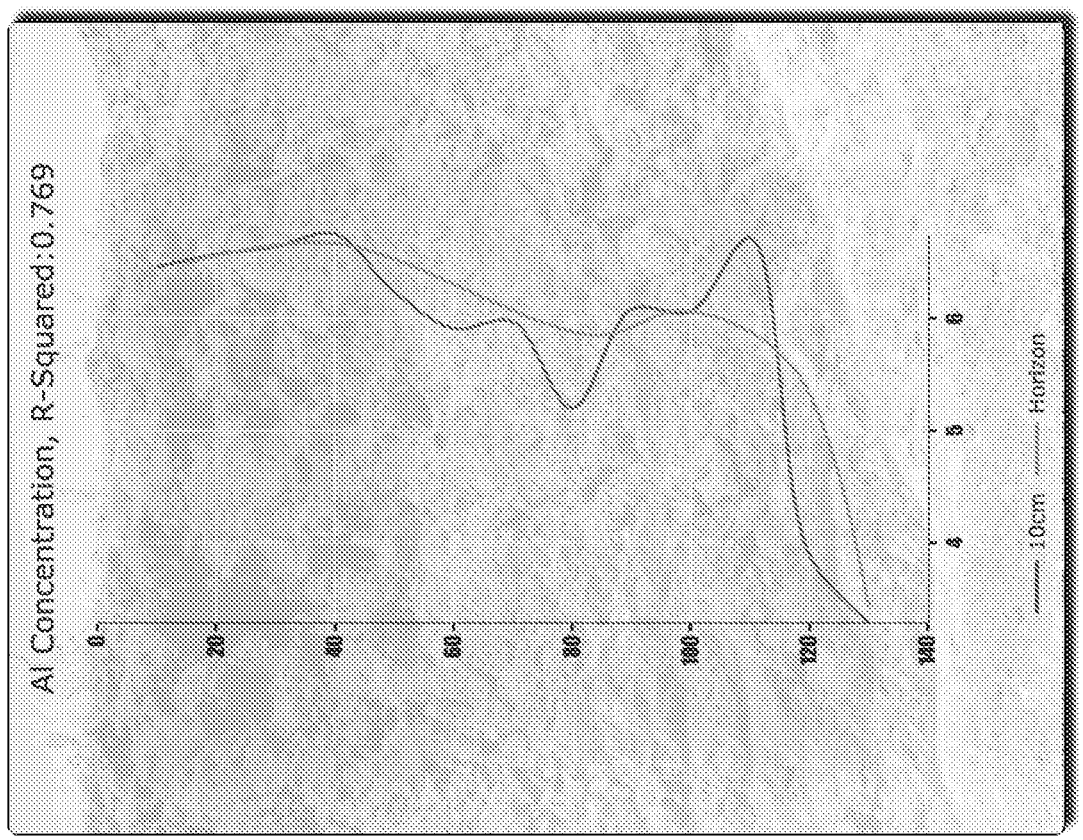
FIGS. 21A-21B depicts goodness-of-fit graphs to show the difference/similarity between the traditional 6-level-horizon approach and 10 cm-horizon across 13 horizons approach to soil horizon analysis in accordance with one embodiment of the present invention.
Figure 21A:
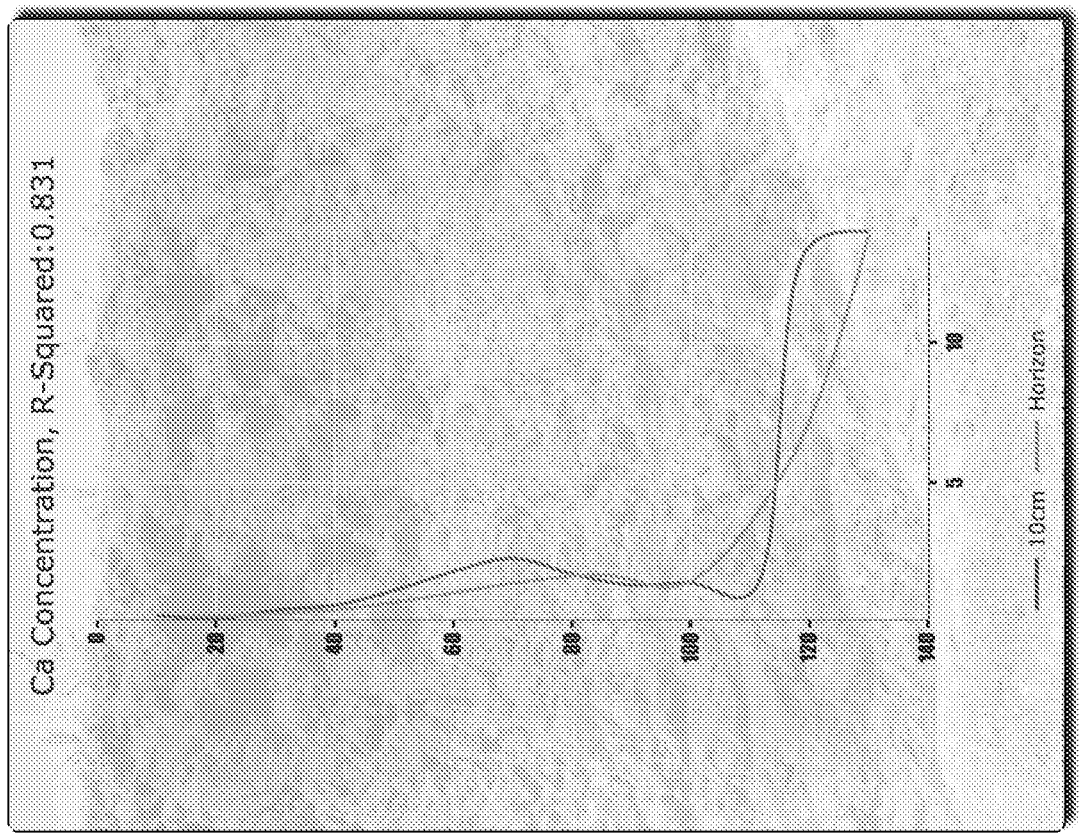

The goodness-of-fit graphs: With the availability of the pXRF devices and its improvement in getting the faster scanning results, it is desirable to explore a new approach to soil horizon analysis using 10 cm horizons (across 13 horizons) instead of the traditional 6-level horizon approach. Comparing to the traditional approach, the newly exploring strategy provides finer details of the chemical element contamination distribution over the pit and better accuracy by having higher sampling frequencies in the horizontal and vertical directions. FIGS. 21A-21B display the curves to visually represent the goodness-of-fit of the averaged concentration values of these two approaches (task T5). To quantify the goodness of-fit between the two curves, the R-squared score is calculated and displayed on top of the element profile.

Users can select any uploaded pXRF soil horizon profile to visualize from the top menu of the visualization. All the visualization views are interconnected, for instance, users can choose any two nodes on the network graph visualization in FIG. 16, the selected nodes will be highlighted (with black borders), and all the views will be updated to compare the two selected elements. Similarly, users could also choose individual chemical elements (or compounds) by names to analyze from the selection boxes at the bottom of the contour-map/heat-map views as in FIGS. 19A-19B and all other views will be updated accordingly.

There are also several interactions to customize individual views while analyzing the data. On the correlation network graph in FIG. 16, users can use the slider at the bottom to set the correlation threshold, the network graph will only show the links for nodes with an absolute value of the correlation greater than or equal to this threshold. The soil scientists would often like to refer back the digital photo taken of the pedon surface while observing the distributions of the contamination of the chemical elements. At the bottom of the contour map/heatmap views, there are sliders for the user to set the opacity of these graphs. Users can lower the opacity to view the soil color and content in the digital photo in the background. Another essential analysis task is that the soil scientists would like to have different views of the contamination levels on the contour-map/heat-map views, so three different color ranges are provided as coarse (5 color ranges), fine (10 color ranges), and smooth (20 color ranges) to select from the top of the system.

For portability, ease of use, and multiple platform compatibility, SOA_HMaViz is implemented as JavaScript based web application using D3.js [72] and Plotly.js [95] libraries.

The soil scientists using the solution in analyzing soil horizon profiles in their lab reported a good use-case regarding analyzing Profile1 (out of the three soil horizon profiles given to us), SOA_HMaViz helps to highlight the extremely high value of Ca concentration in the cell F6 visually in the contour map as shown at the red arrow in the panel (a) of FIG. 19. The soil scientists explained that it could be due to an error that the pXRF equipment was hitting directly to rock in this cell during the scanning time. This outlying cell was then removed from soil horizon Profile1 for better accuracy of the analysis.

Current visualization solution receives positive feedback from these experts as it provides a common framework for analyzing soil horizon scanning data using pXRF devices. Also, they stated that pairing between fast scanning results using pXRF devices and more rapid analysis process using SOA_HMaViz is promising solution to enable the creation of soil profiles for a large number of pedons at consistent results, lower cost, and shorter time.

One additional feature is being able to connect and pull data directly from pXRF devices using various wireless communication channels such as WiFi and Bluetooth. This helps to reduce the data importing process. Another feature is about enabling the users to define more custom color ranges due to different soil profile would have different ranges of chemical contamination values. The current solution of fixing 5, 10, or 20 color levels may work in many general cases as default settings but would still be better to allow users to set color ranges for some specific cases.

This embodiment provided an on-the-fly visualization solution to help to analyze the soil horizon pXRF scanning results which otherwise may takes days. The solution supports several visualizations and interactions to provide perceptions about the data. Also, to quantify the data correlation, several statistical calculations are computed and displayed on the solution. Interactions are provided to aid the analysis tasks. The system allows the user to navigate through different profiles or compare individual elements or change display properties such as opacity and color. The solution was applied to three soil horizon profiles provided by the soil scientists and received positive feedback from the soil scientists and the soil survey staff from USDA.

Connecting to the pXRF devices using WiFi or Bluetooth connection to pull data directly from them to improve time and convenience can enable on-field analysis. Alternatively, deploying the solution directly in the pXRF devices can speed up the analysis process.

Referring back to FIG. 12, the one or more processors of the apparatus receive a data set having two or more variables, receive a selection of a data visualization profile, receive a selection of at least one of the two or more variables, automatically generate and display a set of visual representations of the data set on the display based on the data visualization profile and the selected variable(s), wherein the set of visual representations of the data set comprise one or more of a correlation graph, a contour map, a heatmap, a box-plot or a goodness-of-fit graph, receive a change in the selected variables, the correlation graph, the contour map, the heatmap, the box-plot or the goodness-of-fit graph, determine a visual representation recommendation based on the selected variable(s), the change in the selected variables, the correlation graph, the contour map, the heatmap, the box-plot or the goodness-of-fit graph, and automatically update and display the set of visual representations of the data set on the display based the visual representation recommendation, and the change in the selected variables, the correlation graph, the contour map, the heatmap, the box-plot or the goodness-of-fit graph.

In one aspect, the one or more processors: generate a raw data set using one or more sensors; pre-process the raw data; calculate one or more statistics based on the pre-processed data; interpolate the statistics and/or the pre-processed data; and create the data set based on the interpolated data, the statistics and/or the pre-processed data. In another aspect, the device is portable. In another aspect, the data set comprises a soil data set.

Figure 22:
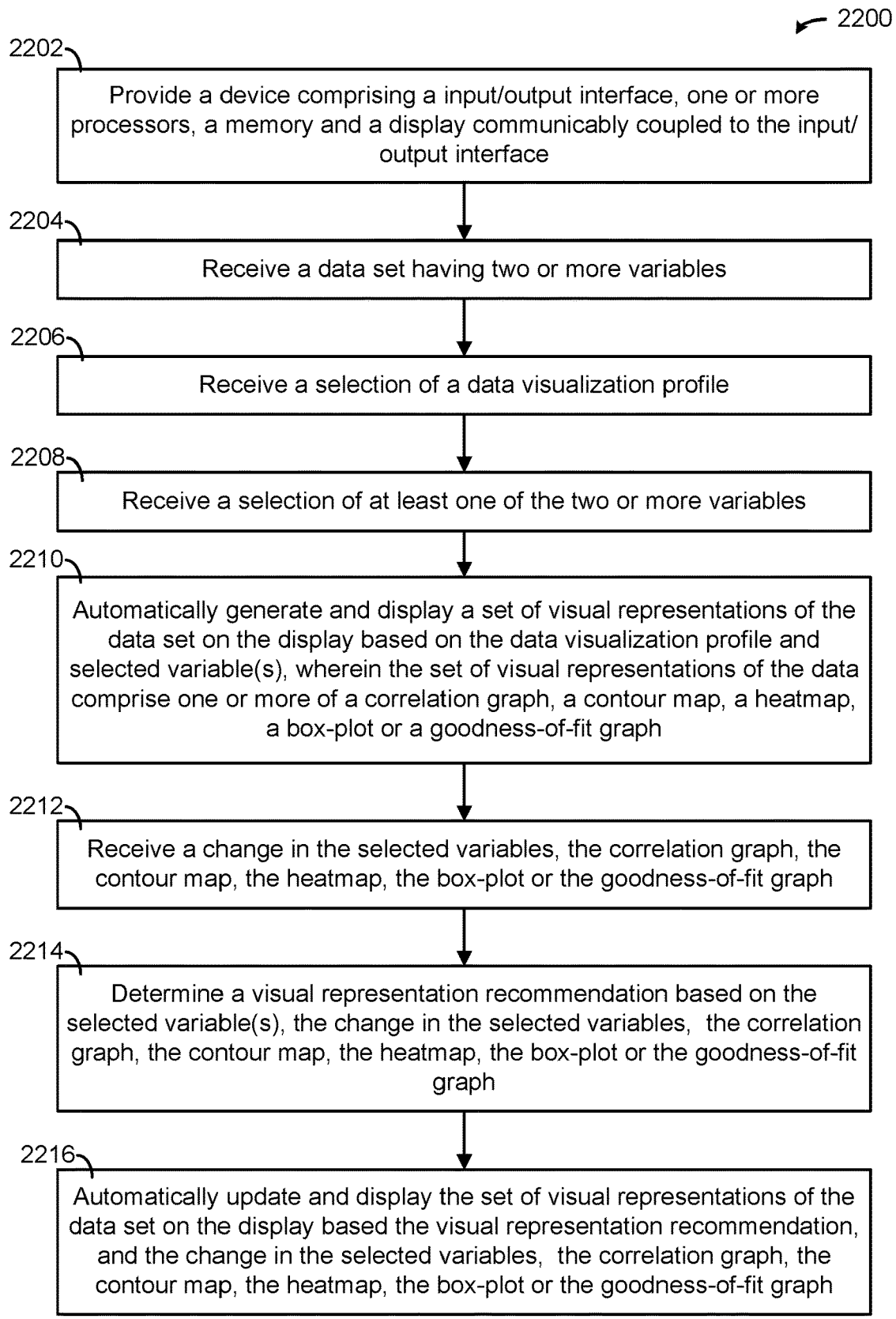
FIG. 22 depicts a flowchart of a computerized method for providing a visual representation of a data set in accordance with one embodiment of the present invention.

Now referring to FIG. 22, a flowchart of a computerized method 2200 for providing a visual representation of a data set in accordance with one embodiment of the present invention is shown. A device having an input/output interface, one or more processors, a memory and a display communicably coupled to the input/output interface is provided in block 2202. A data set having two or more variables is received in block 2204. A selection of a data visualization profile is received in block 2206. A selection of at least one of the two or more variables is received in block 2208. A set of visual representations of the data set is automatically generated and displayed on the display in block 2210 based on the data visualization profile and the selected variable(s), wherein the set of visual representations of the data set comprise one or more of a correlation graph, a contour map, a heatmap, a box-plot or a goodness-of-fit graph. A change in the selected variables, the correlation graph, the contour map, the heatmap, the box-plot or the goodness-of-fit graph is received in block 2212. A visual representation recommendation is determined in block 2214 based on the selected variable(s), the change in the selected variables, the correlation graph, the contour map, the heatmap, the box-plot or the goodness-of-fit graph. The set of visual representations of the data set are automatically updated and displayed on the display in block 2216 based the visual representation recommendation, and the change in the selected variables, the correlation graph, the contour map, the heatmap, the box-plot or the goodness-of-fit graph.

In one aspect, the method further comprises: generating a raw data set using one or more sensors; pre-processing the raw data; calculating one or more statistics based on the pre-processed data; interpolating the statistics and/or the pre-processed data; and creating the data set based on the interpolated data, the statistics and/or the pre-processed data. In another aspect, the device is portable. In another aspect, the data set comprises a soil data set.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of" As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

REFERENCES

1. R. Amar, J. Eagan, and J. Stasko. Low-level components of analytic activity in information visualization. In *Proc. of the IEEE Symposium on Information Visualization*, pp. 15-24, 2005.
2. N. Andrienko, T. Lammarsch, G. Andrienko, G. Fuchs, D. Keim, S. Miksch, and A. Rind. Viewing visual analytics as model building. In *Computer Graphics Forum*, vol. 37, pp. 275-299. Wiley Online Library, 2018.
3. M. Behrisch, M. Blumenschein, N. W. Kim, L. Shao, M. El-Assady, J. Fuchs, D. Seebacher, A. Diehl, U. Brandes, H. Pfister, T. Schreck, D. Weiskopf, and D. A. Keim. Quality metrics for information visualization. *Computer Graphics Forum*, 37(3):625-662, 2018. doi: 10.1111/cgf.13446
4. E. Bertini, A. Tatu, and D. Keim. Quality metrics in high-dimensional data visualization: An overview and systematization. *IEEE Transactions on Visualization and Computer Graphics*, 17(12):2203-2212, 2011.
5. M. Bostock, V. Ogievetsky, and J. Heer. $D^3$ data-driven documents. *IEEE Transactions on Visualization & Computer Graphics*, (12):2301-2309, 2011.
6. G. Brewka, T. Eiter, and M. Truszczynski. Answer set programming at a glance. *Commun. ACM*, 54(12):92-103, December 2011. doi: 10.1145/2043174.2043195
7. D. R. Brillinger, L. T. Fernholz, and S. Morgenthaler. *The practice of data analysis: Essays in honor of John W. Tukey*, vol. 401. Princeton University Press, 2014.
8. E. T. Brown, J. Liu, C. E. Brodley, and R. Chang. Dis-function: Learning distance functions interactively. In 2012 IEEE Conference on Visual Analytics Science and Technology (VAST), pp. 83-92, October 2012. doi: 10.1109/VAST.2012.6400486
10. S. M. Casner. Task-analytic approach to the automated design of graphic presentations. *ACM Transactions on Graphics (ToG)*, 10(2):111-151, 1991.
11. D. Ceneda, T. Gschwandtner, T. May, S. Miksch, H. Schulz, M. Streit, and C. Tominski. Characterizing guidance in visual analytics. *IEEE Transactions on Visualization and Computer Graphics*, 23(1):111-120, January 2017. doi: 10.1109/TVCG.2016.2598468
12. C. Collins, N. Andrienko, T. Schreck, J. Yang, J. Choo, U. Engelke, A. Jena, and T. Dwyer. Guidance in the human machine analytics process. *Visual Informatics*, 2(3):166-180, 2018. doi: 10.1016/j.visinf 2018.09.003
13. T. N. Dang, A. Anand, and L. Wilkinson. Timeseer: Scagnostics for highdimensional time series. *Visualization and Computer Graphics, IEEE Transactions on*, 19(3):470-483, 2013. doi: 10.1109/TVCG.2012.128
14. T. N. Dang and L. Wilkinson. Timeexplorer: Similarity search time series by their signatures. In *International Symposium on Visual Computing*, pp. 280-289. Springer, 2013.
15. T. N. Dang and L. Wilkinson. Transforming scagnostics to reveal hidden features. *IEEE Transactions on Visualization and Computer Graphics*, 20(12):1624-1632, December 2014. doi: 10.1109/TVCG.2014.2346572
16. A. Dasgupta and R. Kosara. Pargnostics: Screen-space metrics for parallel coordinates. *IEEE Transactions on Visualization & Computer Graphics*, (6):1017-1026, 2010.
17. V. Dibia and C. Demiralp. Data2vis: Automatic generation of data visualizations using sequence-to-sequence recurrent neural networks. *arXiv preprint arXiv:1804.03126*, 2018.

18. W. Dou, D. H. Jeong, F. Stukes, W. Ribarsky, H. R. Lipford, and R. Chang. Recovering reasoning processes from user interactions. *IEEE Computer Graphics and Applications*, 29(3):52-61, May 2009. doi: 10.1109/MCG.2009.49
19. F. Fischer, J. Fuchs, and F. Mansmann. ClockMap: Enhancing Circular Treemaps with Temporal Glyphs for Time-Series Data. In M. Meyer and T. Weinkaufs, eds., *EuroVis—Short Papers*, 2012. doi: 10.2312/PE/EuroVis-Short/EuroVisShort2012/097-101
20. L. Fu. Implementation of three-dimensional scagnostics. *Master's thesis, Dept. of Math., Univ. of Waterloo*, 2009.
21. L. Fu. Implementation of three-dimensional scagnostics. Master's thesis, University of Waterloo, Department of Mathematics, 2009.
22. K. R. Gabriel. The biplot graphic display of matrices with application to principal component analysis. *Biometrika*, 58(3):453-467, 1971.
23. GeyserTimes. Eruptions of Old Faithful Geyser, May 2014 [online database]. https://geysertimes.org 2017.
24. N. Good, J. B. Schafer, J. A. Konstan, A. Borchers, B. Sarwar, J. Herlocker, J. Riedl, et al. Combining collaborative filtering with personal agents for better recommendations. In *AAAI/IAAI*, pp. 439-446, 1999.
25. D. Gotz and M. X. Zhou. Characterizing users visual analytic activity for insight provenance. In *2008 IEEE Symposium on Visual Analytics Science and Technology*, pp. 123-130, October 2008. doi: 10.1109/VAST.2008.46773651.
26. Guyon and A. Elisseeff. An introduction to variable and feature selection. *J. Mach. Learn. Res.*, 3:1157-1182, March 2003.
27. P. Hanrahan. Vizql: a language for query, analysis and visualization. In *Proceedings of the 2006 ACM SIGMOD international conference on Management of data*, pp. 721-721. ACM, 2006.
28. J. Hartigan. *Clustering Algorithms*. John Wiley & Sons, New York, 1975.
29. D. Hawkins. *Identification of outliers*. Monographs on applied probability and statistics. Chapman and Hall, London [u.a.], 1980.
30. J. Heer, F. Van Ham, S. Carpendale, C. Weaver, and P. Isenberg. Creation and collaboration: Engaging new audiences for information visualization. In *Information Visualization*, pp. 92-133. Springer, 2008.
31. H. Hochheiser and B. Shneiderman. Dynamic query tools for time series data sets: Timebox widgets for interactive exploration. *Information Visualization*, 3(1):1-18, March 2004. doi: 10.1145/993176.993177 [28] P. T. Inc. Collaborative data science, 2015.
32. P. T. Inc. Collaborative data science, 2015.
33. B. Irad. Outlier detection, data mining, and knowledge discovery handbook: A complete guide for practitioners and researchers, 2005.
34. M. F. Jaing, S. S. Tseng, and C. M. Su. Two-phase clustering process for outliers detection. *Pattern Recogn. Lett.*, 22(6-7):691-700, May 2001. doi:10.1016/S0167-8655(00)00131-8
35. D. A. Keim. Information visualization and visual data mining. *IEEE Transactions on Visualization & Computer Graphics*, (1):1-8, 2002.
36. D. Koop, C. E. Scheidegger, S. P. Callahan, J. Freire, and C. T. Silva. Viscomplete: Automating suggestions for visualization pipelines. *IEEE Transactions on Visualization and Computer Graphics*, 14(6):1691-1698, 2008.
37. J. Mackinlay, P. Hanrahan, and C. Stolte. Show me: Automatic presentation for visual analysis. *IEEE Transactions on Visualization and Computer Graphics*, 13(6): 1137-1144, November 2007. doi: 10.1109/TVCG.2007.70594
38. J. Matute, A. C. Telea, and L. Linsen. Skeleton-based scagnostics. *IEEE Transactions on Visualization & Computer Graphics*, (1):1-1, 2018.
39. D. Moritz, C. Wang, G. Nelson, H. Lin, A. M. Smith, B. Howe, and J. Heer. Formalizing visualization design knowledge as constraints: Actionable and extensible models in draco. *IEEE Trans. Visualization & Comp. Graphics (Proc. InfoVis)*, 2019.
40. T. Munzner. *Visualization analysis and design*. AK Peters/CRC Press, 2014.
41. B. Mutlu, E. Veas, and C. Trattner. Vizrec: Recommending personalized visualizations. *ACM Transactions on Interactive Intelligent Systems (TiiS)*, 6(4):31, 2016.
42. K. Nazemi, R. Retz, J. Bernard, J. Kohlhammer, and D. Fellner. Adaptive semantic visualization for bibliographic entries. In *International Symposium on Visual Computing*, pp. 13-24. Springer, 2013.
43. P. K. M. Owonibi. A review on visualization recommendation strategies. 2017.
44. G. Palmas, M. Bachynskyi, A. Oulasvirta, H. P. Seidel, and T. Weinkauf. An edge-bundling layout for interactive parallel coordinates. In *2014 IEEE Pacific Visualization Symposium*, pp. 57-64, March 2014. doi: 10.1109/PacificVis.2014.40
45. R. Pamula, J. K. Deka, and S. Nandi. An outlier detection method based on clustering. In *2011 Second International Conference on Emerging Applications of Information Technology*, pp. 253-256, February 2011. doi: 10.1109/EAIT.2011.25
46. W. A. Pike, J. Stasko, R. Chang, and T. A. O'Connell. The science of interaction. *Information Visualization*, 8(4):263-274, 2009. doi: 10.1057/ivs.2009.22
47. S. F. Roth, J. Kolojejchick, J. Mattis, and J. Goldstein. Interactive graphic design using automatic presentation knowledge. In *Proceedings of the SIGCHI conference on Human factors in computing systems*, pp. 112-117. ACM, 1994.
48. S. F. Roth and J. Mattis. Data characterization for intelligent graphics presentation. In *Proceedings of the SIGCHI Conference on Human Factors in Computing Systems*, pp. 193-200. ACM, 1990.
49. A. Satyanarayan, D. Moritz, K. Wongsuphasawat, and J. Heer. Vega-lite: A grammar of interactive graphics. *IEEE Transactions on Visualization and Computer Graphics*, 23(1):341-350, 2017.
50. H.-J. Schulz, T. Nocke, M. Heitzler, and H. Schumann. A design space of visualization tasks. *IEEE Transactions on Visualization and Computer Graphics*, 19(12):2366-2375, 2013.
51. J. Seo and B. Shneiderman. A rank-by-feature framework for unsupervised multidimensional data exploration using low dimensional projections. In *Information Visualization, 2004. INFOVIS 2004. IEEE Symposium on*, pp. 65-72. IEEE, 2004.
52. C. Stolte, D. Tang, and P. Hanrahan. Polaris: A system for query, analysis, and visualization of multidimensional relational databases. *IEEE Transactions on Visualization and Computer Graphics*, 8(1):52-65, 2002.
53. X. Su and T. M. Khoshgoftaar. A survey of collaborative filtering techniques. *Advances in artificial intelligence*, 2009, 2009.
54. M. Vartak, S. Huang, T. Siddiqui, S. Madden, and A. Parameswaran. Towards visualization recommendation systems. *ACM SIGMOD Record*, 45(4):34-39, 2017.

55. M. Voigt, M. Franke, and K. Meissner. Using expert and empirical knowledge for context-aware recommendation of visualization components. *Int. J. Adv. Life Sci,* 5:27-41, 2013.
56. E. Wall, L. Blaha, C. Paul, K. Cook, and A. Endert. *Four Perspectives on Human Bias in Visual Analytics,* pp. 29-42. 09 2018. doi: 10.1007/978-3-319-95831-6.3
57. E. Wall, L. M. Blaha, L. Franklin, and A. Endert. Warning, bias may occur: A proposed approach to detecting cognitive bias in interactive visual analytics. In 2017 *IEEE Conference on Visual Analytics Science and Technology (VAST),* pp. 104-115, October 2017. doi: 10.1109/VAST.2017.8585669
58. K. Watanabe, H.-Y. Wu, Y. Niibe, S. Takahashi, and I. Fujishiro. Biclustering multivariate data for correlated subspace mining. In *Visualization Symposium (PacificVis),* 2015 IEEE Pacific, pp. 287-294. IEEE, 2015.
59. H. Wickham. *ggplot2: elegant graphics for data analysis*. Springer, 2016.
60. L. Wilkinson. *The grammar of graphics*. Springer Science & Business Media, 2006.
61. L. Wilkinson. Visualizing big data outliers through distributed aggregation. *IEEE transactions on visualization and computer graphics,* 2017.
62. L. Wilkinson, A. Anand, and R. Grossman. Graph-theoretic scagnostics. 2005.
63. L. Wilkinson, A. Anand, and R. Grossman. High-dimensional visual analytics: Interactive exploration guided by pairwise views of point distributions. *IEEE Transactions on Visualization and Computer Graphics,* 12(6):1363-1372, 2006.
64. K. Wongsuphasawat, D. Moritz, A. Anand, J. Mackinlay, B. Howe, and J. Heer. Voyager: Exploratory analysis via faceted browsing of visualization recommendations. *IEEE Transactions on Visualization & Computer Graphics,* (1):1-1, 2016.
65. K. Wongsuphasawat, Z. Qu, D. Moritz, R. Chang, F. Ouk, A. Anand, J. Mackinlay, B. Howe, and J. Heer. Voyager 2: Augmenting visual analysis with partial view specifications. In *Proceedings of the 2017 CHI Conference on Human Factors in Computing Systems, pp.* 2648-2659. ACM, 2017.
66. J. Yang, A. Patro, S. Huang, N. Mehta, M. O. Ward, and E. A. Rundensteiner. Value and relation display for interactive exploration of high dimensional datasets. In *Proceedings of the IEEE Symposium on Information Visualization,* INFOVIS '04, pp. 73-80. IEEE Computer Society, Washington, DC, USA, 2004. doi: 10.1109/INFOVIS.2004.71
67. A. Yates, A. Webb, M. Sharpnack, H. Chamberlin, K. Huang, and R. Machiraju. Visualizing multidimensional data with glyph sploms. In *Computer Graphics Forum,* vol. 33, pp. 301-310. Wiley Online Library, 2014.
68. AMAR R., EAGAN J., STASKO J.: Low-level components of analytic activity in information visualization. In *Information Visualization, 2005. INFOVIS 2005. IEEE Symposium on* (2005), IEEE, pp. 111-117.
69. ANALYZER X.-R. F.: Vanta Family X-Ray Fluorescence Analyzer.
70. BEHRISCH M., BLUMENSCHEIN M., KIM N. W., SHAO L., EL-ASSADY M., FUCHS J., SEEBACHER D., DIEHL A., BRANDES U., PFISTER H., SCHRECK T., WEISKOPF D., KEIM D. A.: Quality metrics for information visualization. *Computer Graphics Forum* 37, 3 (2018), 625-662.
71. BAKR N., EL-ASHRY S. M.: Organic matter determination in arid region soils: loss-on-ignition versus wet oxidation. *Communications in soil science and plant analysis* 49, 20 (2018), 2587-2601.
72. BOSTOCK M., OGIEVETSKY V., HEER J.: D3 data-driven documents. *IEEE transactions on visualization and computer graphics* 17, 12 (2011), 2301-2309.
73. COLLINS C., ANDRIENKO N., SCHRECK T., YANG J., CHOO J., ENGELKE U., JENA A., DWYER T.: Guidance in the humanâA˜S, machine analytics process. *Visual Informatics* 2, 3 (2018), 166-180.
74. CENEDA D., GSCHWANDTNER T., MAY T., MIKSCH S., SCHULZ H., STREIT M., TOMINSKI C.: Characterizing guidance in visual analytics. *IEEE Transactions on Visualization and Computer Graphics* 23, 1 (January 2017), 111-120.
75. CURI N., MANCINI M., DOS SANTOS TEIXEIRA A. F., WEINDORF D. C., CHAKRABORTY S., SILVA S. H. G., GUILHERME L. R. G.: Tracing tropical soil parent material analysis via portable X-ray fluorescence (pXRF) spectrometry in Brazilian Cerrado. *Geoderma* 337, October 2018 (2018), 718-728.
76. CAMERON A. C., WINDMEIJER F. A.: An r-squared measure of goodness of fit for some common nonlinear regression models. *Journal of econometrics* 77, 2 (1997), 329-342.
77. CHAKRABORTY S., WEINDORF C. A., DAS B. S., DUDA B., WEINDORF D. C., LI B., ORTIZ R., PENNINGTON S.: Semiquantitative Evaluation of Secondary Carbonates via Portable X-ray Fluorescence Spectrometry. *Soil Science Society of America Journal* 81, 4 (2017), 844.
78. DANG T. N., ANAND A., WILKINSON L.: TimeSeer: Scagnostics for high-dimensional time series. *IEEE Trans. Vis. Comput Graph.* 19, 3 (March 2013), 470-483.
79. DANG T. N., WILKINSON L.: Scagexplorer: Exploring scatterplots by their scagnostics. In *2014 IEEE Pacific Visualization Symposium* (March 2014), pp. 73-80.
80. DANG T. N., WILKINSON L.: Transforming scagnostics to reveal hidden features. *IEEE Transactions on Visualization and Computer Graphics* 20, 12 (December 2014), 1624-1632.
81. FU W., ZHAO K., ZHANG C., WU J., TUNNEY H.: Outlier identification of soil phosphorus and its implication for spatial structure modeling. *Precision agriculture* 17, 2 (2016), 121-135.
82. GUYON I., ELISSEEFF A.: An introduction to variable and feature selection. *J. Mach. Learn. Res.* 3 (March 2003), 1157-1182.
83. GUILHERME L. R. G., INDA A. V., HARTEMINK A. E., SILVA S. H. G., TEIXEIRA A. F. D. S., CURI N.: Soil weathering analysis using a portable X-ray fluorescence (PXRF) spectrometer in an Inceptisol from the Brazilian Cerrado. *Applied Clay Science* 162, June (2018), 27-37.
84. HINTZE J. L., NELSON R. D.: Violin plots: a box plot-density trace synergism. *The American Statistician* 52, 2 (1998), 181-184.
85. KEIM D. A., PANSE C., SIPS M.: Information visualization: Scope, techniques and opportunities for geovisualization. In *Exploring Geovisualization,* Dykes J., (Ed.). Elsevier, Oxford, 2004, pp. 1-17.
86. LEGORIA M., BAKR N., ZHU Y., CHAKRABORTY S., HAGGARD B., WEINDORF W. C., LOFTON J., ZHANG W., WEINDORF D. C.: Enhanced Pedon Horizonation Using Portable X-ray Fluorescence Spectrometry. *Soil Science Society of America Journal* 76, 2 (2012), 522.
87. MCGLADDERY C., WEINDORF D. C., CHAKRABORTY S., LI B., PAULETTE L., PODAR D., 87. PEARSON D., KUSI N. Y. O., DUDA B.: Elemental assessment of vegetation via portable x-ray fluorescence (pxrf) spectrometry. *Journal of Environmental Management* 210 (2018), 210-225.
88. NAGELKERKE N. J. D.: A Note on a General Definition of the Coefficient of Determination Miscellanea A note on a general definition of the coefficient sf determination. 691-692.
89. NETER J., WASSERMAN W., KUTNER M. H.: Applied linear regression models.
90. PAULETTE L., MAN T., WEINDORF D. C., PERSON T.: Rapid assessment of soil and contaminant variability via portable x-ray fluorescence spectroscopy: CopÅ§ a MicÄC", Romania. *Geoderma* 243-244 (2015), 130-140.
91. ROBERTS J. C.: State of the art: Coordinated multiple views in exploratory visualization. In *Fifth International Conference on Coordinated and Multiple Views in Exploratory Visualization (CMV 2007)* (July 2007), pp. 61-71.
92. ROSSEL R. V., WALVOORT D., MCBRATNEY A., JANIK L., SKJEMSTAD J.: Visible, near infrared, mid infrared or combined diffuse reflectance spectroscopy for simultaneous assessment of various soil properties. *Geoderma* 131, 1 (2006), 59-75.
93. SNEDECOR G., COCHRAN W.: The sample correlation coefficient r and properties of r. *Statistical Methods* (1980), 175-178.
94. STOCKMANN U., CATTLE S. R., MINASNY B., MCBRATNEY A. B.: Utilizing portable X-ray fluorescence spectrometry for infield investigation of pedogenesis. *Catena* 139 (2016), 220-231.
95. SIEVERT C., PARMER C., HOCKING T., CHAMBERLAIN S., RAM K., CORVELLEC M., DESPOUY P.: plotly: Create interactive web graphics via âA˜Yplotly.jsâA˜Z'. *R package version* 4, 1 (2017).
96. STAFF S. S.: Soil Taxonomy, A Basic System of Soil Classification for Making and Interpreting Soil Surveys. *Soil Science* 123, 4 (2006), 270.
97. VAN BEERS W.: Kriging metamodeling in discrete-event simulation: an overview. In *Proceedings of the 37th conference on Winter simulation* (2005), Winter Simulation Conference, pp. 202-208.
98. WILKINSON L., ANAND A., GROSSMAN R.: Graph-theoretic scagnostics. In *Proceedings of the IEEE Information Visualization 2005* (2005), IEEE Computer Society Press, pp. 157-164.
99. WILKINSON L., ANAND A., GROSSMAN R.: High-dimensional visual analytics: Interactive exploration guided by pairwise views of point distributions. *IEEE Transactions on Visualization and Computer Graphics* 12, 6 (2006), 1363-1372.
100. WEINDORF D. C., BAKR N., ZHU Y.: *Advances in portable X-ray fluorescence (PXRF) for environmental, pedological, and agronomic applications*, vol. 128. Elsevier, 2014.
101. WANG D., CHAKRABORTY S., WEINDORF D. C., LI B., SHARMA A., PAUL S., ALI M. N.: Synthesized use of VisNIR DRS and PXRF for soil characterization: Total carbon and total nitrogen. *Geofisica Internacional* 243 (April 2015), 157-167.
102. WEINDORF D. C.; CHAKRABORTY S. H. J. L. B. C. C. C. A.: Simultaneous assessment of key properties of arid soil by combined pxrf and vis-nir data. *European Journal of Soil Science* 67, 2 (2016), 173-183.
103. WILKINSON L.: Visualizing big data outliers through distributed aggregation. *IEEE transactions on visualization and computer graphics* (2017).
104. WESSELING J. G., OOSTINDIE K., RITSEMA C. J., DEKKER L. W.: A software tool to visualize soil moisture dynamics of an irregular-shaped profile. *Computers and Geosciences* 60 (2013), 51-57.
105. ZHANG C., TANG Y., LUO L., XU W.: Outlier identification and visualization for pb concentrations in urban soils and its implications for identification of potential contaminated land. *Environmental Pollution* 157, 11 (2009), 3083-3090.
106. ZHU Y., WEINDORF D. C., ZHANG W.: Characterizing soils using a portable X-ray fluorescence spectrometer: 1. Soil texture. *Geoderma* 167-168 (2011), 167-177.

What is claimed is:

1. A computerized method for providing a visual representation of a data set comprising:
   providing a device having an input/output interface, one or more processors, a memory and a display communicably coupled to the input/output interface;
   receiving a data set having two or more variables;
   receiving a selection of at least one of the two or more variables, an abstraction level and a visual feature type;
   automatically generating and displaying a set of visual representations of the data set on the display, wherein the set of visual representations comprise at least a guided navigation view that displays a high-level overview of all the variables at the selected abstraction level using the selected visual feature type, a focus view that displays a close-up view in which each selected variable is represented as a dimension at the selected abstraction level using the selected visual feature type, and an expanded view that displays multiple views automatically selected by the one or more processors that add another variable to each multiple view such that the another variable and each selected variable are represented as dimensions in each multiple view;
   receiving a change in the selected variables, selected abstraction level, the selected visual feature type, or a selection from the guided navigation view, the focus view or the expanded view;
   determining a visual representation recommendation based on the selected variable(s), selected abstraction level and the selected visual feature type, the change in the selected variables, selected abstraction level, the selected visual feature type, or the selection from the guided navigation view, the focus view or the expanded view; and
   automatically updating and displaying the set of visual representations of the data set on the display based the visual representation recommendation, and the change in the selected variables, selected abstraction level, the selected visual feature type, or the selection from the guided navigation view, the focus view or the expanded view.

2. The method of claim 1, wherein:
   the selected abstraction level comprises a default abstraction level; or
   the selected visual feature type comprises a default visual feature type or a stored visual feature type.

3. The method of claim 1, wherein:
   the selected abstraction level comprises individual instances, regular binning, data-dependent binning or abstracted; and
   the selected visual feature type comprises outlier, variance, multimodality, skewness, skinny, striated, stringy, monotonic, convex, clumpy, parallelism, angles of crossing, correlation, line crossings, pixel-based entropy, convergence or over-plotting.

4. The method of claim 1, wherein the set of visual representations further comprise an overview that plots the statistical driven features or an exemplar view that displays multiple views of different visual feature types automatically selected by the one or more processors.

5. The method of claim 1, further comprising storing the visual representation recommendation in a user profile.

6. The method of claim 1, wherein:
the visual abstraction level comprises individual data points, regular binning, data-dependent binning or abstracted/grouped data; and
the visual feature type comprising outlying, multi-moded, skewness or principal component(s).

7. The method of claim 1, further comprising repeating the receiving the change, determining the visual representation recommendation, and automatically updating and displaying the set of visual representations of the data set.

8. The method of claim 1, wherein the set of visual representations are defined by a catalog of visualizations.

9. The method of claim 1, wherein the visual representation recommendation narrows down a smaller set of visualizations that suit a user's analysis.

10. The method of claim 1, further comprising:
generating a raw data set using one or more sensors;
pre-processing the raw data;
calculating one or more statistics based on the pre-processed data;
interpolating the statistics and/or the pre-processed data; and
creating the data set based on the interpolated data, the statistics and/or the pre-processed data.

11. The method of claim 1, wherein the device is portable.

12. The method of claim 1, wherein the data set comprises a soil data set.

13. The method of claim 1, wherein the set of visual representations of the data set comprise one or more of a correlation graph, a contour map, a heatmap, a box-plot or a goodness-of-fit graph.

14. An apparatus for providing a visual representation of a data set comprising:
an input/output interface;
a memory;
a display communicably coupled to the input/output interface; and
one or more processors communicably coupled to the input/output interface and the memory, wherein the one or more processors:
receive a data set having two or more variables,
receive a selection of at least one of the two or more variables, an abstraction level and a visual feature type,
automatically generate and display a set of visual representations of the data set on the display, wherein the set of visual representations comprise at least a guided navigation view that displays a high-level overview of all the variables, a focus view that displays a close-up view in which each selected variable is represented as a dimension at the selected abstraction level using the selected visual feature type, and an expanded view that displays multiple views automatically selected by the one or more processors that add another variable to each multiple view such that the another variable and each selected variable are represented as dimensions in each multiple view,
receive a change in the selected variables, selected abstraction level, the selected visual feature type, or a selection from the guided navigation view, the focus view or the expanded view,
determine a visual representation recommendation based on the selected variable(s), selected abstraction level and the selected visual feature type, the change in the selected variables, selected abstraction level, the selected visual feature type, or the selection from the guided navigation view, the focus view or the expanded view, and
automatically update and display the set of visual representations of the data set on the display based the visual representation recommendation, and the change in the selected variables, selected abstraction level, the selected visual feature type, or the selection from the guided navigation view, the focus view or the expanded view.

15. The apparatus of claim 14, wherein:
the selected abstraction level comprises a default abstraction level; or
the selected visual feature type comprises a default visual feature type or a stored visual feature type.

16. The apparatus of claim 14, wherein:
the selected abstraction level comprises individual instances, regular binning, data-dependent binning or abstracted; and
the selected visual feature type comprises outlier, variance, multimodality, skewness, skinny, striated, stringy, monotonic, convex, clumpy, parallelism, angles of crossing, correlation, line crossings, pixel-based entropy, convergence or over-plotting.

17. The apparatus of claim 14, wherein the set of visual representations further comprise an overview that plots the statistical driven features or an exemplar view that displays multiple views of different visual feature types automatically selected by the one or more processors.

18. The apparatus of claim 14, wherein the one or more processors store the visual representation recommendation in a user profile.

19. The apparatus of claim 14, wherein:
the visual abstraction level comprises individual data points, regular binning, data-dependent binning or abstracted/grouped data; and
the visual feature type comprising outlying, multi-moded, skewness or principal component(s).

20. The apparatus of claim 14, wherein the one or more processors repeat receiving the change, determining the visual representation recommendation, and automatically updating and displaying the set of visual representations of the data set.

21. The apparatus of claim 14, wherein the set of visual representations are defined by a catalog of visualizations.

22. The apparatus of claim 14, wherein the visual representation recommendation narrows down a smaller set of visualizations that suit a user's analysis.

23. The apparatus of claim 14, wherein the one or more processors:
generate a raw data set using one or more sensors;
pre-process the raw data;
calculate one or more statistics based on the pre-processed data;
interpolate the statistics and/or the pre-processed data; and
create the data set based on the interpolated data, the statistics and/or the pre-processed data.

24. The apparatus of claim 14, wherein the apparatus is portable.

25. The apparatus of claim 14, wherein the data set comprises a soil data set.

26. The apparatus of claim 14, wherein the set of visual representations of the data set comprise one or more of a correlation graph, a contour map, a heatmap, a box-plot or a goodness-of-fit graph.

27. A computerized method for providing a visual representation of a soil data set comprising:
proving a device having an input/output interface, one or more processors, a memory and a display communicably coupled to the input/output interface;
receiving the soil data set having two or more variables;
detecting one or more distributions and correlations of chemical elements within the soil data set;
receiving a selection of a data visualization profile;
receiving a selection of at least one of the two or more variables;
automatically generating and displaying a set of visual representations of the one or more distributions and correlations of the chemical elements within the soil data set on the display based on the data visualization profile and the selected variable(s), wherein the set of visual representations of the data set comprise one or more of a correlation graph, a contour map, a heatmap, a box-plot or a goodness-of-fit graph;
receiving a change in the selected variables, the correlation graph, the contour map, the heatmap, the box-plot or the goodness-of-fit graph;
determining a visual representation recommendation based on the selected variable(s), the change in the selected variables, the correlation graph, the contour map, the heatmap, the box-plot or the goodness-of-fit graph; and
automatically updating and displaying the set of visual representations of the data set on the display based the visual representation recommendation, and the change in the selected variables, the correlation graph, the contour map, the heatmap, the box-plot or the goodness-of-fit graph.

28. The method of claim 27, further comprising:
generating a raw soil data set using one or more sensors;
pre-processing the raw soil data;
calculating one or more statistics based on the pre-processed soil data;
interpolating the statistics and/or the pre-processed soil data; and
creating the soil data set based on the interpolated soil data, the statistics and/or the pre-processed soil data.

29. The method of claim 27, wherein the device is portable.

30. An apparatus for providing a visual representation of a soil data set comprising:
an input/output interface;
a memory;
a display communicably coupled to the input/output interface; and
one or more processors communicably coupled to the input/output interface and the memory, wherein the one or more processors:
receive the data set having two or more variables;
receive a selection of a data visualization profile;
detect one or more distributions and correlations of chemical elements within the soil data set;
receive a selection of at least one of the two or more variables;
automatically generate and display a set of visual representations of the one or more distributions and correlations of the chemical elements within the soil data set on the display based on the data visualization profile and the selected variable(s), wherein the set of visual representations of the data set comprise one or more of a correlation graph, a contour map, a heatmap, a box-plot or a goodness-of-fit graph;
receive a change in the selected variables, the correlation graph, the contour map, the heatmap, the box-plot or the goodness-of-fit graph;
determine a visual representation recommendation based on the selected variable(s), the change in the selected variables, the correlation graph, the contour map, the heatmap, the box-plot or the goodness-of-fit graph; and
automatically update and display the set of visual representations of the data set on the display based the visual representation recommendation, and the change in the selected variables, the correlation graph, the contour map, the heatmap, the box-plot or the goodness-of-fit graph.

31. The apparatus of claim 30, wherein the one or more processors:
generate a raw soil data set using one or more sensors;
pre-process the raw soil data;
calculate one or more statistics based on the pre-processed soil data;
interpolate the statistics and/or the pre-processed soil data; and
create the data set based on the interpolated soil data, the statistics and/or the pre-processed soil data.

32. The apparatus of claim 30, wherein the device is portable.

33. The method of claim 27, wherein the set of visual representations of the one or more distributions and correlations of the chemical elements within the soil data comprise a visual correlation of the chemical elements within the soil data, a visual concentration of the chemical elements across a two dimensional cell within the soil data, or a visual concentration of the chemical elements across cross-sectional horizontal levels within the soil data.

34. The apparatus of claim 30, wherein the set of visual representations of the one or more distributions and correlations of the chemical elements within the soil data comprise a visual correlation of the chemical elements within the soil data, a visual concentration of the chemical elements across a two dimensional cell within the soil data, or a visual concentration of the chemical elements across cross-sectional horizontal levels within the soil data.

* * * * *